United States Patent
Casey

(10) Patent No.: US 10,455,426 B2
(45) Date of Patent: *Oct. 22, 2019

(54) WINDOWING METHODS AND SYSTEMS FOR USE IN TIME-FREQUENCY ANALYSIS

(71) Applicant: AMERICAN UNIVERSITY, Washington, DC (US)

(72) Inventor: Stephen D. Casey, Ashburn, VA (US)

(73) Assignee: AMERICAN UNIVERSITY, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/274,450

(22) Filed: Sep. 23, 2016

(65) Prior Publication Data

US 2017/0012664 A1 Jan. 12, 2017

Related U.S. Application Data

(63) Continuation-in-part of application No. 13/464,843, filed on May 4, 2012, now Pat. No. 9,454,511.

(60) Provisional application No. 61/482,424, filed on May 4, 2011, provisional application No. 61/482,435, filed on May 4, 2011.

(51) Int. Cl.
*H04B 1/00* (2006.01)
*H04W 16/10* (2009.01)
*G06F 17/14* (2006.01)
*H04B 1/7163* (2011.01)

(52) U.S. Cl.
CPC .......... *H04W 16/10* (2013.01); *G06F 17/141* (2013.01); *H04B 1/71632* (2013.01)

(58) Field of Classification Search
CPC ..................................................... H04B 1/707
See application file for complete search history.

(56) References Cited

U.S. PATENT DOCUMENTS

| | | | |
|---|---|---|---|
| 5,262,958 A | 11/1993 | Chui et al. | |
| 5,757,684 A * | 5/1998 | Zaugg | H04L 25/03828 708/322 |
| 5,959,965 A * | 9/1999 | Ohkubo | H04L 27/2657 370/203 |
| 7,253,761 B1 | 8/2007 | Hoyos et al. | |
| 7,525,873 B1 | 4/2009 | Bush et al. | |
| 2003/0088418 A1 | 5/2003 | Kagoshima et al. | |
| 2005/0105460 A1* | 5/2005 | Suh | H04L 5/0023 370/203 |

(Continued)

OTHER PUBLICATIONS

B. Jawerth and W. Sweldens, "Biorthogonal Smooth Local Trigonometric Bases", The Journal of Fourier Analysis and Applications; vol. 2, No. 2, 1995, pp. 109-133.

(Continued)

*Primary Examiner* — Shuwang Liu
*Assistant Examiner* — Gina M McKie
(74) *Attorney, Agent, or Firm* — Fitch, Even, Tabin & Flannery, LLP

(57) ABSTRACT

The present embodiments include methods of time-frequency analyzing signals. Some embodiments provide methods of processing signals comprising: adaptively partitioning at least a portion of a signal in a time domain into a plurality of segments of the signal; and transforming each of the segments of the signal producing respective expansions in a frequency domain and obtaining respective samples of the windows of signal in the frequency domain.

20 Claims, 9 Drawing Sheets

(56) References Cited

U.S. PATENT DOCUMENTS

| | | | |
|---|---|---|---|
| 2005/0107977 A1* | 5/2005 | Edwards | G01R 31/3271 702/118 |
| 2009/0252259 A1 | 10/2009 | Ikeda | |
| 2013/0182754 A1* | 7/2013 | Das | H04L 25/03885 375/232 |

OTHER PUBLICATIONS

S. Hoyos and B. Sadler, "Frequnecy-Domain Implementation of the Transmitted-Reference Ultra-Wideband Receiver", IEEE Transactions Microwave Theory and Techniques, vol. 54, No. 4, Apr. 2006, pp. 1745-1753.

H. Malvar, "Biorthogonal and Nonuniform Lapped Transforms for Transform Coding with Reduced Blocking and Ringing Artifacts", IEEE Transactions of Siganl Processing, vol. 46, No. 4, Apr. 1998, pp. 1043-1053.

S. Hoyos, B. Sadler and G.R. Arce, "Broadband Multicarrier Communication Receiver Based on Analog to Digital Conversion in the Frequency Domain", IEEE Transactions on Wireless Communications, vol. 5, No. 3, Mar. 2006, pp. 652-661.

S. Hoyos and B. Sadler, "Ultra-Wideband Analog-to-Digital Conversion via Signal Expansion", IEEE Transactions on Vehicular Technology, vol. 54, No. 5, Sep. 2005, pp. 1609-1622.

S. Casey, "Windowing Systems for Time-Frequency Analysis", Sampling Theory in Signal and Image Processing, vol. 11, No. 2-3, 2012, pp. 221-251.

S. Hoyos and B. Sadler, "UWB Mixed-Signal Transform-Domain Direct-Sequence Receiver", IEEE Transactions on Wireless Communications, vol. 6, No. 8, Aug. 2007, pp. 3038-3046.

S.D. Casey, Adaptive and Ultra-Wideband Sampling via Signal Segmentation and Projection, Dept. Mathematics and Stat., American University, (http://american.summon.serialssolutions.com/search?s.q=adaptive+and+ultra-wideband+sampling&s.fvf%5B%5D=ContentType%2CNewspaper+Article%2Ctrue&spellcheck=true&keep_r=true), 2009.

* cited by examiner

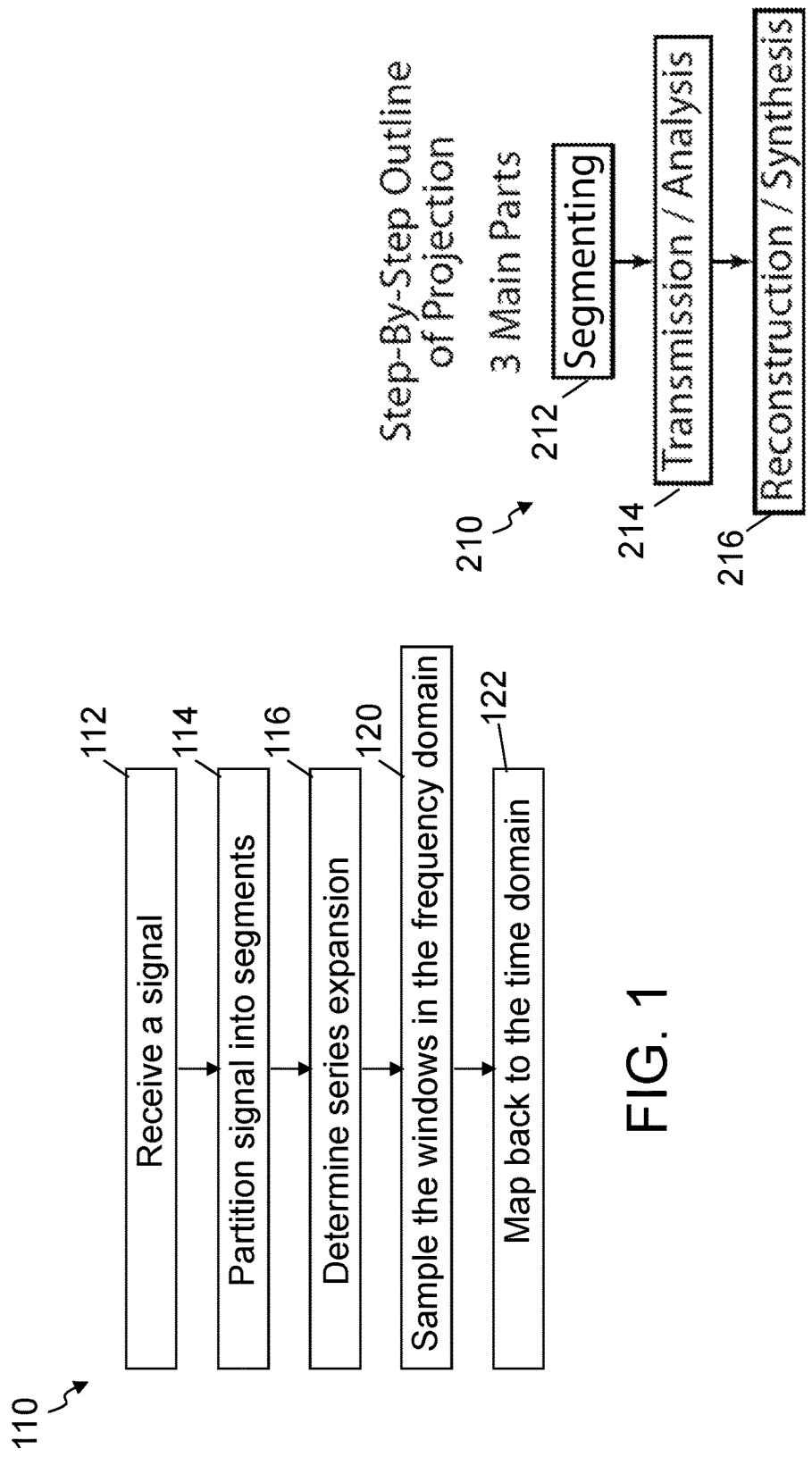

Projection Method Overview
Segmented Stationary Point-of-View

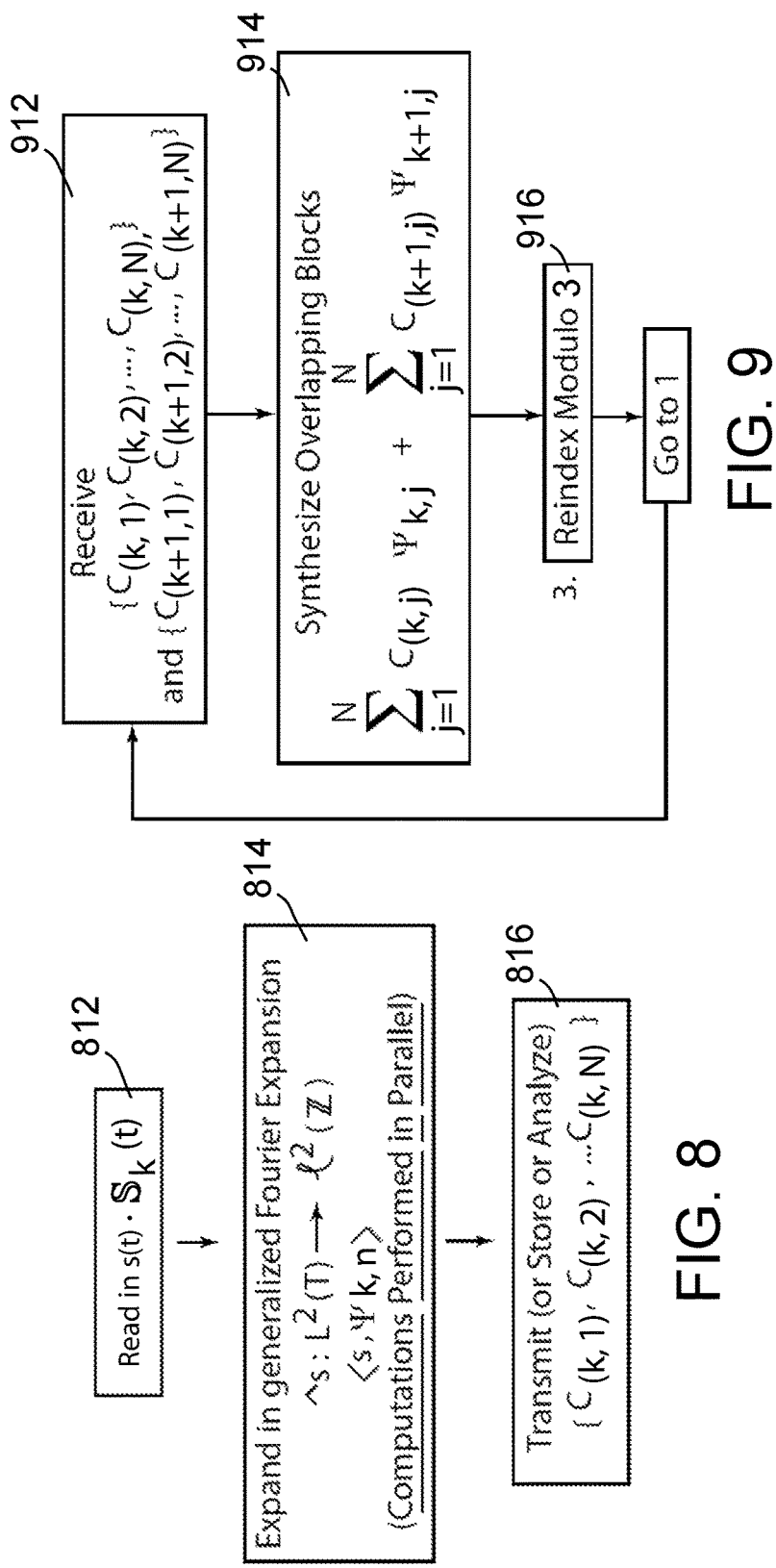

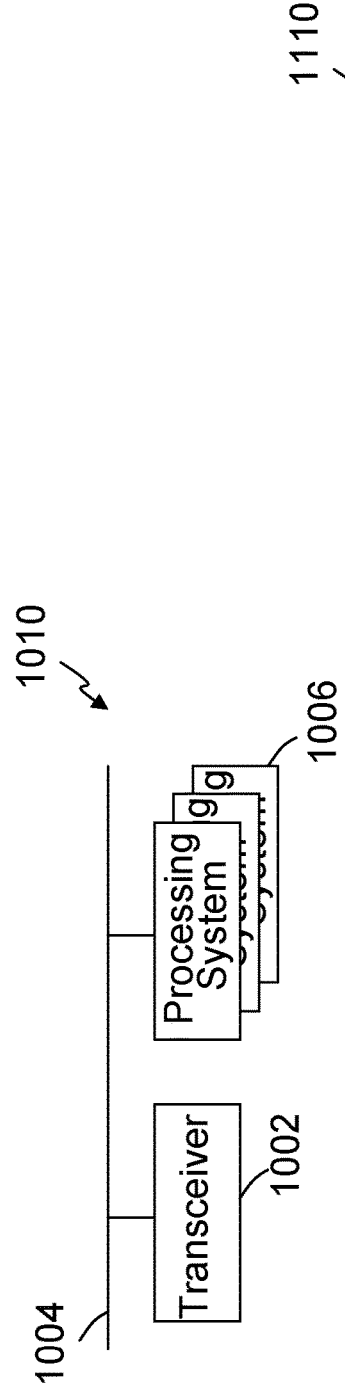
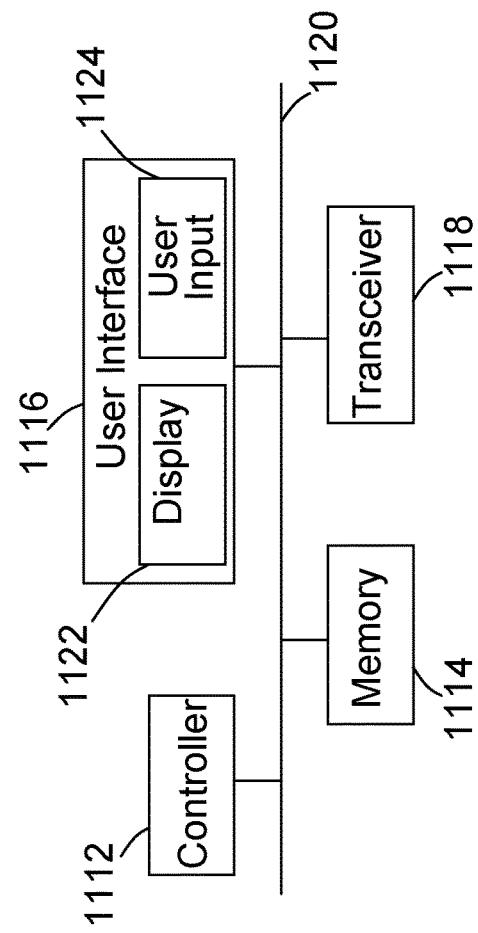

WINDOWING METHODS AND SYSTEMS FOR USE IN TIME-FREQUENCY ANALYSIS

This application is a continuation-in-part of U.S. patent application Ser. No. 13/464,843, filed May 4, 2012, for Stephen D. Casey, entitled WINDOWING METHODS AND SYSTEMS FOR USE IN TIME-FREQUENCY ANALYSIS, which claims the benefit of U.S. Provisional Application No. 61/482,424, filed May 4, 2011, for Stephen D. Casey, entitled WINDOWING SYSTEMS FOR TIME-FREQUENCY ANALYSIS, and U.S. Provisional Application No. 61/482,435, filed May 4, 2011, for Stephen D. Casey et al., entitled ADAPTIVE AND ULTRA-WIDE-BAND SAMPLING VIA PROJECTION, all of which are incorporated in their entirety herein by reference.

The United States Government may have rights in this invention pursuant to Contract No, DAAD19-02-D-0001 between U.S. Army Research Office Scientific Services program and American University.

BACKGROUND

1. Field of the Invention

The present invention relates generally to time-frequency analysis, and more specifically to signal processing.

2. Discussion of the Related Art

The communication of information has always been important. The amount of information that is communicated continues to rapidly increase. Further, the importance of those communications continues to increase.

As people become more mobile and as technology continues to advance the amount of information communicate is expected to continue to increase.

SUMMARY OF THE INVENTION

Several embodiments of the invention advantageously address the needs above as well as other needs through methods of providing time-frequency analysis, such as in the processing of signals. Some embodiments provide methods of processing signals comprising: receiving a communication signal; adaptively partitioning the signal in a time domain into a plurality of segments of the signal; transforming each of the segments of the signal producing respective expansions in a frequency domain and obtaining respective samples of the segments of signal in the frequency domain while preserving orthogonality of basis elements in the segments, including regions of overlap; and mapping the samples in the frequency domain back into the time domain.

Further embodiments provide methods of processing a signal, comprising: receiving a signal; partitioning the signal in a time domain into a plurality of segments of the signal; and transforming each of the segments of the signal producing respective expansions in a frequency domain, where for each segment of the signal of the respective expansions are obtained through parallel processing obtaining in parallel respective samples of the windows of signal in the frequency domain.

Additionally, some embodiments provide method of processing a signal, comprising: processing a signal; partitioning the signal in a time domain into a plurality of segments of the signal; and transforming each of the segments of the signal producing respective expansions in a frequency domain and obtaining respective samples of the segments of signal in the frequency domain while preserving orthogonality between at least two of the plurality of segments.

Other embodiments provide methods of processing a signal, comprising: receiving a communication signal; adaptively partitioning the signal in a time domain into a plurality of segments of the signal, wherein the adaptively partitioning comprises applying B-splines in constructing the basis windows of the signal; and transforming each of the segments of the signal producing respective expansions in a frequency domain and analyzing the transformed segments of the signal in the frequency domain.

Some embodiments provide methods of processing a signal, comprising: by one or more processors: adaptively partitioning at least a portion of a communication signal, in a time domain, into a plurality of segments of the signal; and transforming each of the segments of at least the portion of the signal producing respective expansions in a frequency domain and obtaining respective samples of the segments of the signal in the frequency domain while preserving orthogonality of basis elements in the segments, including regions of overlap.

Further, some embodiments provide a method of processing a signal, comprising: by one or more processors: partitioning at least a portion of a signal, in a time domain, into a plurality of segments of the signal; and transforming each of the segments of at least the portion of the signal producing respective expansions in a frequency domain while preserving orthogonality between the windows including overlapping regions of two adjacent segments, wherein for each segment of the signal of the respective expansions are obtained through parallel processing obtaining in parallel respective samples of the segments of signal in the frequency domain.

Additionally, some embodiments provide methods of processing a signal, comprising: by one or more processors: partitioning at least a portion of a signal in a time domain into a plurality of segments of the signal; and transforming each of the segments of the signal producing respective expansions in a frequency domain and obtaining respective samples of the segments of signal in the frequency domain while preserving orthogonality between at least two of the plurality of segments.

Still further embodiments provide methods of processing a signal, comprising: adaptively partitioning at least a portion of a communication signal in a time domain into a plurality of segments of the signal, wherein the adaptively partitioning comprises applying B-splines in constructing the basis windows of the signal; and transforming each of the segments of the signal producing respective expansions in a frequency domain and analyzing the transformed segments of the signal in the frequency domain.

Still further embodiments provide method of processing a signal, having: by one or more processors: adaptively partitioning at least a portion of a communication signal, in a time domain, into a plurality of segments of the signal; and transforming each of the segments of at least the portion of the signal producing respective expansions in a frequency domain and obtaining respective samples of the segments of the signal in the frequency domain while preserving orthogonality of basis elements in the segments, including regions of overlap. In some embodiments, the method optionally provides mapping the samples in the frequency domain back into the time domain. In some embodiments, the method optionally provides the transforming the segments of the signal comprises individually applying generalized Fourier series to each of the windows of the signal. In some embodiments, the method optionally provides adaptively partitioning the at least the portion of the signal in the time domain into the plurality of segments comprises applying B-splines in constructing the basis windows of the signal. In some embodiments, the method optionally provides the adaptively partitioning the at least the portion of the signal in the time domain into the plurality of segments comprises controlling a smoothness in time and corresponding decay in frequency of each window of the signal by controlling the basis windowing and basis elements. In some embodiments, the method optionally provides the adaptively partitioning the at least the portion of the signal in the time domain into the plurality of segments comprises partitioning the at least the portion of the signal in the time domain into the plurality of segments such that a plurality of the segments that are adjacent have overlapping segment boundaries. In some embodiments, the method optionally provides the adaptively partitioning the at least the portion of the signal in the time domain into the plurality of segments comprises defining the partitions such that orthogonality is preserved for orthonormal (ON) system between adjacent windows. In some embodiments, the method optionally further provides encoding the signal through an encoder, comprising performing: the adaptively partitioning the at least the portion of the signal in the time domain into the plurality of segments of the signal; and the transforming each of the segments of the signal producing respective expansions in the frequency domain and obtaining respective samples of the segments of the signal in the frequency domain while preserving orthogonality of basis elements in the segments, including the regions of overlap.

Still further embodiments provide methods of processing a signal, having steps by one or more processors of partitioning at least a portion of a signal, in a time domain, into a plurality of segments of the signal; and transforming each of the segments of at least the portion of the signal producing respective expansions in a frequency domain while preserving orthogonality between the segments including overlapping regions of two adjacent segments, wherein for each segment of the signal of the respective expansions are obtained through parallel processing obtaining in parallel respective samples of the segments of the signal in the frequency domain. In some embodiments, the method optionally provides the transforming each of the segments comprises transforming each of the segments such that sampling coefficients for an entire segment is constructed simultaneously in parallel in the frequency domain. In some embodiments, the method optionally further provides mapping the samples in the frequency domain back into the time domain. In some embodiments, the method optionally provides the partitioning the signal comprises adaptively partitioning the signal such that each of the plurality of segments are partitioned as a function of bandwidth of the window. In some embodiments, the method optionally provides the partitioning the signal comprises partitioning the signal according to a fixed segment size of each of the plurality of segments.

Still further embodiments provide methods of processing a signal, comprising by one or more processors partitioning at least a portion of a signal in a time domain into a plurality of segments of the signal; and transforming each of the segments of the signal producing respective expansions in a frequency domain and obtaining respective samples of the segments of signal in the frequency domain while preserving orthogonality in the region of overlap in the segments. In some embodiments, the method optionally provides partitioning the at least the portion of the signal comprises partitioning the at least the portion of the signal such that the at least two of the plurality of segments have overlapping regions; and wherein the transforming each of the windows of the signal comprises transforming each of the segments of the signal while preserving the orthogonality between the plurality of segments including preserving the orthogonality in the overlapping regions. In some embodiments, the method optionally provides partitioning the signal in the time domain into the plurality of segments comprises applying B-splines in constructing the basis windows of the signal. In some embodiments, the method optionally provides partitioning the signal in the time domain into the plurality of segments of the signal comprises adaptively partitioning the signal in the time domain into the plurality of segments of the signal such that the segments vary as a function of bandwidth.

Still further embodiments provide a method of processing a signal comprising adaptively partitioning at least a portion of a communication signal in a time domain into a plurality of segments of the signal, wherein the adaptively partitioning comprises applying B-splines in constructing the basis windows of the signal; and transforming each of the segments of the signal producing respective expansions in a frequency domain and analyzing the transformed segments of the signal in the frequency domain. In some embodiments, the method optionally provides transforming each of the segments of the signal producing respective expansions in the frequency domain comprises transforming each of the segments of the signal while preserving orthogonality between adjacent segments. In some embodiments, the method optionally provides partitioning the signal comprises partitioning the signal such that the at least two of the plurality of segments have overlapping regions; and wherein the transforming each of the segments of the signal comprises transforming each of the segments of the signal while preserving the orthogonality between the adjacent segments including preserving the orthogonality in the overlapping regions.

BRIEF DESCRIPTION OF THE DRAWINGS

The above and other aspects, features and advantages of several embodiments of the present invention will be more apparent from the following more particular description thereof, presented in conjunction with the following drawings.

FIG. 1 depicts a simplified flow diagram of a process of signal sampling and/or analyzing in accordance with some embodiments.

FIG. 2 depicts a simplified flow diagram of a process of projection methods of sampling according to some embodiments.

FIG. 8 shows a simplified flow diagram of a process of providing the transmission and/or analysis of the segmented signal, in accordance with some embodiments.

FIG. 9 depicts a simplified flow diagram of a process of providing a reconstruction and/or synthesis of coefficients in accordance with some embodiments.

FIG. 10 illustrates a system that may be used in processing signals in accordance with at least some embodiments.

FIG. 11 illustrates a system for use in implementing methods, techniques, devices, apparatuses, systems, modules, units and the like in providing user interactive virtual environments in accordance with some embodiments.

Figure 3A:
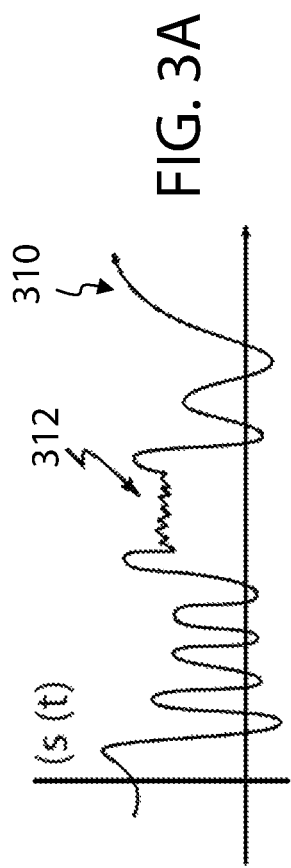
FIG. 3A depicts a simplified graphical representation of a signal.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The present embodiments provide methods and systems for use providing time-frequency analysis, such as in processing communication signals and other relevant signals. The signal processing can include, for example, improved sampling, filtering, encoding, analog-to-digital conversion, and other processing. Some embodiments employ a segmentation and basis windowing technique that provides effective time and/or frequency analysis of functions. Still further, some embodiments provide segmentation and basis windowing that can have variable partitioning length, variable roll-off and/or variable smoothness. This variable windowing can be particularly effective, for example, with adaptive frequency band (AFB) and ultra-wide band (UWB) signals and systems, and other relevant signals and systems.

FIG. 1 depicts a simplified flow diagram of a process 110 of signal sampling and/or analyzing in accordance with some embodiments. In step 112 a signal is received. In step 114, the signal is partitioned into segments or blocks based on time. Further, the partitioning can provide for adaptive partitioning such that segments or blocks can be can vary, in at least some embodiments, based on variations in, for example, bandwidth of the portions of the signal relative to corresponding segments of time. In step 116, the windows are processed to provide determine respective periodic expansions, for example, through a generalized Fourier series. In many implementations, the respective periodic expansions are approximations based on the series. In step 120, sampling is performed of the window of the signal in the frequency domain relative to basis coefficients. In step 122, the sampling is mapped back to the time domain. The mapping, in some instances can include reconstructing the signal from the sampling of basis coefficients to recover samples in the time domain.

The use of the varying blocks allows the methods and systems to accommodate varying bandwidths within a signal. Further, this variation provides enhanced sampling of varying signals, including signals such as adaptive frequency band (AFB) signals. Additionally, some embodiments provide a sampling of signals through a basis projection as further describe below.

FIG. 2 depicts a simplified flow diagram of a process 210 of projection methods of sampling according to some embodiments. In step 212, a signal is segmented or blocked based on time. Again, the segmentation may provide for adaptive segmenting such that the segments can vary over the signal. In step 214, a time and/or frequency analysis is performed of the signal based on the segmentation and the sampling obtained through the windowing. In step 216, a synthesis of the sampling is performed, which in part can provide a reindexing for the analysis of step 214.

Figure 3B:
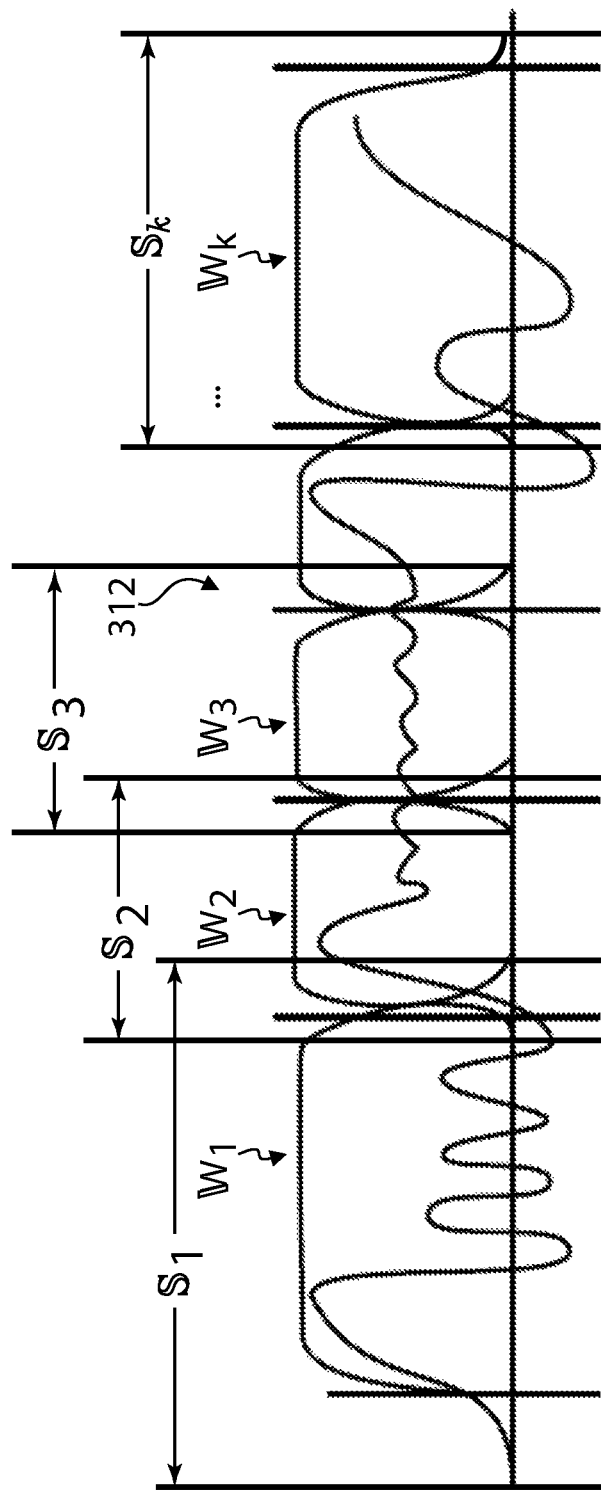
FIG. 3B shows an enlarged version of a portion of the signal of FIG. 3A with segments and basis windows defined over a portion of the signal in accordance with some embodiments.

FIG. 3A depicts a simplified graphical representation of a signal 310. The signal has a varying bandwidth, which can include for example a high frequency bursts 312 and/or portions of low bandwidth variation. FIG. 3B shows an enlarged version of a portion of the signal 310 of FIG. 3A, including the high frequency burst 312, with segments and basis windows defined over a portion of the signal in accordance with some embodiments. As described above, some embodiments provide for segments and basis windows over at least one or more portions of the signal, and the segments can span various time portions of the signal.

Still referring to FIG. 3B, multiple segments $\mathbb{S}_1$-$\mathbb{S}_k$ and multiple basis windows $\mathbb{W}_1$-$\mathbb{W}_k$ are defined over the portion of the signal 310 depicted. The multiple segments $\mathbb{S}_1$-$\mathbb{S}_k$ and multiple basis windows $\mathbb{W}_1$-$\mathbb{W}_k$ vary over the signal. For example, the segments $\mathbb{S}_2$, $\mathbb{S}_3$ and basis windows $\mathbb{W}_2$, $\mathbb{W}_3$, etc. corresponding to the high frequency burst 312 have periods $\tau_2$, $\tau_3$, etc. that are shorter in time than, for example, the period $\tau_1$ of the window $W_1$ preceding the high frequency burst 312 of the signal 310. Some embodiments may provide for discontinuity between basis windows. Other embodiments, as further described below, provide basis windows that can be defined with overlapping boundaries and/or regions.

The general process of windowing a signal in time and/or frequency can enhance the time-frequency analysis of a signal. Low-pass, high-pass or band-pass filters can be developed by effective windowing in frequency, whereas windowing systems in time provide tools for local analysis of a given function. The present embodiments provide windowing methods and systems that provide effective blocking (or tiling), efficient basis roll-off, and smoothness-decay. Further, some embodiments provide variable partitioning length of the blocks, variable roll-off and/or variable smoothness.

Some embodiments construct smooth adaptive partitions of unity, or bounded adaptive partitions of unity systems, which can be generalizations of bounded uniform partitions of unity in that they allow for signal adaptive windowing. This can give a flexible adaptive partition of unity of variable smoothness and are useful whenever a partition of unity is used, such as in compressed sensing.

Many embodiments utilize splines, such as B-splines, as the construction elements. Some embodiments additionally preserve orthogonality of orthonormal (ON) system between adjacent blocks. The construction here uses orthonormal basis for $L^2(R)$ and can be created, for example, by solving a Hermite interpolation problem with constraints. These orthonormal preserving basis windowing systems provide methods of time-frequency analysis for a wide class of signals. Alternatively, some embodiments employ a method of almost orthogonality. The almost orthogonality can employ the B-spline techniques to create almost orthogonal basis windowing that can, in at least some instances, be more easily computable and/or more readily implemented through hardware and/or software.

The general system, which we refer to as the projection method, is implemented as follows. Let A be a set in the time domain, e.g., an interval. Let $$\chi_A(t) = \begin{cases} 1 & t \in A \\ 0 & t \notin A \end{cases}.$$

The function $\chi_A$ is usually called the indicator or characteristic function of A. Signal segments $\mathbb{S}_k$ are characteristic functions of intervals, and they serve the purpose of segmenting the signal into time blocks. For fixed time windows T, they have the form $$\mathbb{S}_k = \chi_{[(k)T-r,(k+1)T+r]}(t).$$

In all but the most elementary models of the projection method, these segments overlap. Within each segment, the signal is expanded in the basis elements $\Psi_{k,j}(t)$ specifically designed to fit in that segment. The $\Psi_{k,j}$ are created as $\Psi_{k,j} = \{\mathcal{T}_{[(k)T+T/2]} \mathbb{W}_I \widetilde{\varphi_j}\ ](t)\}$, where $\mathbb{W}_I$ is a basis window centered at the origin, $\widetilde{\varphi_j}$ is a folded basis component in that region, and $\mathcal{T}_l$ is a translation operator putting the basis element $\Psi_{k,j}$ in the correct place. According to one approach, a fundamental exemplary equation of the invention can be as follows. If the set $\{\Psi_{k,j}\}$ is an ON basis system, given any square integrable signal $f$, $$f(t) = \sum_{k \in \mathbb{Z}} \left[ \sum_{j \in \mathbb{N}} \langle f, \Psi_{k,j} \rangle \Psi_{k,j}(t) \right]. \quad (1)$$

In the regions in which the segments overlap, the basis elements are folded, so that they dovetail with the elements of the adjacent region and form a basis system for all square integrable signals. Embodiments of the invention are variations and/or approximations of formula (1). For UWB systems, T will be a short fixed length determined by bandwidth, and for AFB systems, T=T(t), a variable length determined by bandwidth.

In accordance with some embodiments, basis windowing for partitions of unity $\{\mathbb{B}_k\}$ are configured which satisfy $$\sum_k \mathbb{B}_k(t) \equiv 1. \quad (2)$$

A difference between the partition of unity systems and orthonormal systems is that the latter preserve orthogonality in the overlapping regions of signal segments. To preserving orthogonality, ON windows $\{\mathbb{W}_k\}$ must satisfy $$\sum_k [\mathbb{W}_k(t)]^2 \equiv 1. \quad (3)$$

The almost orthogonal systems $\{\mathbb{A}_k(t)\}$ have a parameter $\delta$, $0 \leq \delta < \frac{1}{2}$, such that $$1 - \delta \leq \sum_k [\mathbb{A}_k(t)]^2 \leq 1 + \delta. \quad (4)$$

Accordingly, the present embodiments comprise methods and systems that provide computable atomic decomposition of time-frequency space relative to signals and/or communications. At least some of these embodiments are configured to analyze signals and allow for changing frequency bands and/or ultra-wide frequency bands. This can be achieved through non-uniformly windowing or blocking time and/or frequency. When a signal has, for example, a burst of high-frequency information, some embodiments window or block quickly (or provide fairly short duration blocks) and efficiently in time and broadly in frequency, whereas when the signal has a relatively low-frequency segment, the methods and systems can block or window broadly in time and efficiently in frequency. The methods can be implemented through hardware and/or software.

At least some of the embodiments employ Fourier Series or other forms of transformation. (see for example, J. J. Benedetto, *Harmonic Analysis and Applications*, CRC Press, Boca Raton, Fla., 1997. [1, p. 254], which is incorporated herein by reference in its entirety) Accordingly, let $f$ be a periodic, integrable function on $\mathbb{R}$, with period $2\Phi$, i.e., $f \in L^1(\mathbb{T}_{2\Phi})$. The Fourier coefficients of $f$, $\hat{f}[n]$, are defined by:

$$\hat{f}[n] = \frac{1}{2\Phi} \int_{-\Phi}^{\Phi} f(t) \exp(-i\pi nt/\Phi) dt.$$

If $\{\hat{f}[n]\}$ is absolutely summable ($\{\hat{f}[n]\} \in l^1$), then the Fourier series of $f$ can be defined by:

$$f(t) = \sum_{n \in \mathbb{Z}} \hat{f}[n] \exp(i\pi nt/\Phi).$$

For $f \in L^1$, the Fourier transform $\hat{f}(\omega)$ is given as follows.

With the Fourier transform and inversion formulae, let $f \in L^1$. The Fourier transform of $f$ can be defined as:

$$\hat{f}(\omega) = \int_{\mathbb{R}} f(t) e^{-2\pi i \omega t} dt,$$

for $t \in \mathbb{R}$ (time), $\omega \in \hat{\mathbb{R}}$ (frequency). The inversion formula, for $\hat{f} \in L^1(\hat{\mathbb{R}})$, can be defined by:

$$f(t) = (\hat{f})^{\vee}(t) = \int_{\hat{\mathbb{R}}} \hat{f}(\omega) e^{2\pi i \omega t} d\omega.$$

Transforms are extended to square integrable functions. i.e., $f \in L^2(\mathbb{R})$, by a continuity argument. The choice to have $2\pi$ in the exponent can simplify certain expressions in accordance with some embodiments, e.g., Parseval's equality—

$$\|f\|L^2(\mathbb{R}) = \|\hat{f}\|L^2(\hat{\mathbb{R}}).$$

The transform and the coefficient integral can be considered as analysis, and the inverse transform and series as synthesis.

The process of periodization can be used in many if not all of the embodiments. Considering a block of a signal on an interval [0, T], the periodization of that signal block can be used to expand a Fourier series of sines and cosines.

Further, letting T>0 and letting g(t) be a function such that supp $g \subseteq [0, T]$. The T-periodization of g can be:

$$[g]^{\circ}(t) = \sum_{n=-\infty}^{\infty} g(t - nT).$$

Classical sampling theory applies to band-limited square integrable functions. A function that is both band-limited and $L^2$ typically has several smoothness and growth properties given in the Paley-Weiner Theorem. This class of functions can be referred to as $\mathbb{PW}_\Omega$. The Whittaker-Kotel'nikov-Shannon (W-K-S) Sampling Theorem applies to functions in $\mathbb{PW}_\Omega$. The Paley-Wiener Space $\mathbb{PW}_\Omega$ can be defined as:

$$\mathbb{PW}_\Omega = \{f : \hat{f} \in L^2, \sup(\hat{f}) \subset [-\Omega, \Omega]\}$$

The W-K-S Sampling Theorem, gives that, if $$f \in \mathbb{PW}_\Omega, \operatorname{sinc}_T(t) = \frac{\sin\left(\frac{\pi}{T}t\right)}{\pi t} \text{ and } \delta_{nT} = \delta(t - nT),$$

then a.) When $T \leq \frac{1}{2\Omega}$, then for $t \in \mathbb{R}$, $$f(t) = T \sum_{n \in \mathbb{Z}} f(nT) \frac{\sin\left(\frac{\pi}{T}(t-nT)\right)}{\pi(t-nT)} = T\left(\left[\sum_{n \in \mathbb{Z}} \delta_{nT}\right] f\right) * \operatorname{sinc}_T(t).$$

b.) When $T \leq \frac{1}{2\Omega}$ and $f(nT) = 0$ for all $n \in \mathbb{Z}$, then $f \equiv 0$.

We use the ON windowing systems to develop a sampling theory for ultra-wide and adaptive bandwidth signals.

Again, some embodiments operate through a projection of the signal onto blocks in time. For example, orthonormal (ON) windowing systems are provided and developed to provide incorporate a sampling theory for ultra-wide and adaptive bandwidth signals. Accordingly, the present embodiments can represent changes of view in sampling, from that of a stationary view of a signal used in classical sampling to, at least in part, an adaptive windowed view or adaptive windowed stationary view. For example, this adaptive windowing, such as with at least some AFB cases, provides that the time and frequency space block or tile occupied by the signal changes in time. The basis windows establish partitions of time and/or frequency so that signal can be sampled efficiently. In ultra-wide band (UWB) cases, for example, advantage is taken of the windowing to partition the signal quickly and efficiently, and in some instances uniformly. In some embodiments, within the blocks, the signal can be sampled in parallel.

As introduced above, some embodiments provide partition of unity that provide for segmenting Time and/or Frequency ($\mathbb{R} - \hat{\mathbb{R}}$) space. The partitioning provided can have variable partitioning length, variable roll-off, and/or variable smoothness. The windows make smooth adaptive partitions of unity, or bounded adaptive partitions of unity systems. For example, these can be generalizations of bounded uniform partitions of unity in that they allow for signal adaptive windowing. The construction elements for these methods and system are B-splines and take advantage of the concept of "perfect spline construction" (e.g., see I. J. Schoenberg, Cardinal Spline Interpolation (CBMS-NSF Conference Series in Applied Mathematics, 12), SIAM. Philadelphia, Pa., 1973, incorporated by reference). The B-splines give control over smoothness in time and corresponding decay in frequency. The present embodiments can be configured to provide varying degrees of smoothness with cutoffs adaptive to signal information, e.g., bandwidth.

For example, in some embodiments, a straightforward system is created by $\{\chi_{[(k)T,(k+1)T]}(t)\}$, for $k \in \mathbb{Z}$. A second example can be developed by studying the de la Vall'ee-Poussin kernel used in Fourier series (see T. W. Körnrer, Fourier Analysis, Cambridge University Press. Cambridge, 1988). Consider a signal block of length T+2r at the origin. Let $0 < r \ll T/2$. Let $$\operatorname{Tri}_L(t) = \max\{[((T/(4r)) + \frac{1}{2}) - |t|/(2r)], 0\},$$

$$\operatorname{Tri}_S(t) = \max\{[((T/(4r)) - \frac{1}{2}) - |t|/(2r)], 0\} \text{ and}$$

$$\operatorname{Trap}_{[-T/2-r, T/2+r]}(t) = \operatorname{Tri}_L(t) - \operatorname{Tri}_S(t).$$

The Trap function can have perfect overlay in the time domain and $(1/\omega^2)$ decay in frequency space. When one time block is ramping down, an adjacent block is ramping up at the same rate, and typically at exactly the same rate. The system using overlapping Trap functions has the advantage of $\mathcal{O}(1/\omega^2)$ decay in frequency. Let $\beta_L = \sqrt{(T/(4r)) + \frac{1}{2}}$, $\alpha_L = T/(4r) + r/2$, $\beta_S = \sqrt{(T/(4r)) - \frac{1}{2}}$, and $\alpha_S = T/(4r) - r/2$. The Fourier transform of Trap equals:

$$\operatorname{Trap}^{\wedge}(\omega) = \left[(\beta_L) \frac{\sin(2\pi \alpha_L \omega)}{\pi \omega}\right]^2 - \left[(\beta_S) \frac{\sin(2\pi \alpha_S \omega)}{\pi \omega}\right]^2. \quad (5)$$

Further, some embodiments provide a bounded adaptive partition of unity. A bounded adaptive partition of unity is a set of functions $\{\mathbb{B}_k(t)\}$ such that:

(i.) $\operatorname{supp}(\mathbb{B}_k(t)) \subseteq [kT-r, (k+1)T+r]$ for all $k$, (ii.) $\mathbb{B}_k(t) = 1$ for $t \in [kT+r, (k+1)T-r]$ for all $k$, (iii.) $\Sigma \mathbb{B}_k(t) = 1$, (iv.) $\{\widehat{[\mathbb{B}_k]^{\circ}}[n]\}$ is absolutely summable, i.e. $\{\widehat{[\mathbb{B}_k]^{\circ}}[n]\} \in l^1$. (6)

Conditions (i.), (ii.) and (iii.) make $\{(\mathbb{B}_k(t)\}$ a bounded partition of unity. Condition (iv.) provides for the computation of Fourier coefficients.

For example, let $f \in \mathbb{PW}_\Omega$ and $\{\mathbb{B}_k(t)\}$ be a bounded adaptive partition of unity with generating window $\mathbb{B}_I$. Let $[f]°$ be the T+2r periodization of $f$. Then $$\frac{1}{T+2r}\int_{-T/2-r}^{T/2+r} [f \cdot \mathbb{B}_I]°(t)\exp(-2\pi i n t/[T+2r])\,dt = \widehat{[f]°} * \widehat{\mathbb{B}}_I[n]. \quad (7)$$

The above is supported as follows:

$$\frac{1}{\mathbb{I}}\int_\mathbb{I} \text{ denote } \frac{1}{T+2r}\int_{-T/2-r}^{T/2+r} \text{ and } \mathbb{I} \text{ denote } [T+2r].$$

Then $$\begin{aligned}
\hat{G}[n] &= \frac{1}{\mathbb{I}}\int_\mathbb{I} [f \cdot \mathbb{B}_I]°(t)\exp(-2\pi i n t/\mathbb{I})\,dt \quad (8)\\
&= \frac{1}{\mathbb{I}}\int_\mathbb{I} \left[\sum_k \widehat{\mathbb{B}}_I[k]\exp(2\pi i k t/\mathbb{I})\right][f]°(t)\exp(-2\pi i n t/\mathbb{I})\,dt\\
&= \sum_k \widehat{\mathbb{B}}_I[k] \frac{1}{\mathbb{I}}\int_\mathbb{I} [f]°(t)\exp(-2\pi i (n-k) t/\mathbb{I})\,dt\\
&= \sum_k \widehat{\mathbb{B}}_I[k][\widehat{f}]°[n-k]\\
&= \widehat{[f]°} * \widehat{\mathbb{B}}_I[n].
\end{aligned}$$

Examples:

$$\{\mathbb{B}_k(t)\} = \bigcup_{k\in\mathbb{Z}} \chi_{[(k)T,(k+1)T]}(t)$$

$$\{\mathbb{B}_k(t)\} = \bigcup_{k\in\mathbb{Z}} \text{Trap}_{[(k)T-r,(k+1)T+r]}(t)$$

The above first example has jump discontinuities at segment boundaries of the blocks and has $1/\omega$ decay in frequency. The above second example is continuous, but typically not differentiable, and has overlaps at segment boundaries of the blocks. This system has $1/\omega^2$ decay in frequency. Some embodiments generate systems by translations and dilations of a given window $\mathbb{B}_1$ where $\text{supp}(\mathbb{B}_I)=[-T/2-r,T/2+r]$. The generating window function $\mathbb{B}_I$ is k-times differentiable, has $\text{supp}(\mathbb{B}_I)=[-T/2-r, T/2+r]$, and has values:

$$\mathbb{B}_I = \begin{cases} 0 & |t| \geq T/2 + r \\ 1 & |t| \leq T/2 - r \\ \rho(\pm t) & T/2 - r < |t| < T/2 + r \end{cases} \quad (9)$$

The $\rho(t)$ can be solved by solving the Hermite interpolation problem:

$$\begin{cases} (a.) & \rho(T/2-r) = 1 \\ (b.) & \rho^{(n)}(T/2-r) = 0, \quad n=1, 2, \ldots, k \\ (c.) & \rho^{(n)}(T/2+r) = 0, \quad n=0, 1, 2, \ldots, k \end{cases},$$

with the conditions that $\rho \in C^k$ and $$[\rho(t)]+[\rho(-t))]=1 \text{ for } t\in[T/2-r,T/2+r]. \quad (10)$$

As described above, B-splines can be used. In some embodiments the B-splines are used as the cardinal functions. For example, let $0<\alpha \ll \beta$ and consider $\chi_{[-\alpha,\alpha]}$. It is desirable, in at least some embodiments, that the n-fold convolution of $\chi_{[\alpha,\alpha]}$ fit in the interval $[-\beta, \beta]$. Further, $\alpha$ is chosen so that $0<n\alpha<\beta$, and let:

$$\Psi(t) = \underbrace{\chi_{[-\alpha,\alpha]} * \chi_{[-\alpha,\alpha]} * \cdots * \chi_{[-\alpha,\alpha]}(t)}_{n\text{-times}}.$$

The $\beta$-periodic continuation of this function, $\Psi°(t)$ has the Fourier series expansion $$\sum_{k\neq 0} \frac{\alpha}{n\beta}\left[\frac{\sin(\pi k \alpha/n\beta)}{2\pi k\alpha/n\beta}\right]^n \exp(\pi i k t/\beta).$$

The $C^k$ solution for $\rho$ is given by a theorem of Schoenberg (see I. J. Schoenberg, *Cardinal Spline Interpolation* (CBMS-NSF Conference Series in Applied Mathematics, 12), SIAM, Philadelphia, Pa., 1973, pp. 7-8). Schoenberg solved the Hermite interpolation problem with endpoints −1 and 1. An interpolant that minimizes the Chebyshev norm is called the perfect spline. The perfect spline S(t) for the Hermite problem with endpoints −1 and 1 such that $$S(1)=1, S^{(n)}(1)=0, n=1,2,\ldots,k, S^{(n)}(-1)=0, n=0,1,2,\ldots,k$$

is given by the integral of the function $$M(x) = (-1)^n \sum_{j=0}^k \frac{\Psi(t-t_j)}{\phi'(t_j)},$$

where $\Psi$ is the k−1 convolution of characteristic functions, the knot points are $$t_j = -\cos\left(\frac{\pi j}{n}\right),$$

$j=0, 1, \ldots, n$ and $\varphi(t)\Pi_{j=0}^k(t-t_j)$. When k is even, the midpoint occurs at the k/2 knot point. If k is odd, the midpoint occurs at the midpoint between k/2 and (k+1)/2 knot points. Accordingly, the following is provided:

$$\rho(t) = S \circ l(t), \text{ where } l(t) = -\frac{1}{r}t + \frac{T}{2r}.$$

For this $\rho$, and for $$\mathbb{B}_I = \begin{cases} 0 & |t| \geq T/2+r \\ 1 & |t| \leq T/2-r \\ \rho(\pm t) & T/2-r < |t| < T/2+r \end{cases}.$$

$\widehat{\mathbb{B}}_I(\omega)$ is given by the antiderivative of a linear combination of functions of the form $$\left[\frac{\sin(\pi k\alpha\omega/nT)}{2\pi k\alpha\omega/nT}\right]^n,$$

and therefore has a decay of $1/\omega^{n+1}$ in frequency.

As described above, some embodiments provide adaptive orthonormal (ON) basis windowing. These embodiments provide sets of windows so that the orthogonality of bases in adjacent and possible overlapping blocks is preserved. These embodiments are provide, in at least some implementations, based on solving a Hermite interpolation problem and enables control over smoothness in time and/or corresponding decay in frequency. In some embodiments, the systems implemented to provide varying degrees of smoothness with cutoffs adaptive to signal bandwidth.

Some systems of basis enveloping use sine, cosine and linear functions. These embodiments can be relatively easy to implement, can cut down on frequency error and/or can preserve orthogonality. As an example, a signal block of length T+2r centered at the origin can be considered. Let 0<r<<T/2. In some instances, it is desirable to minimize r as small as possible. The Cap(t) can be defined as follows:

$$\text{Cap}(t) = \begin{cases} 0 & |t| \geq T/2+r, \\ 1 & |t| \leq T/2-r, \\ \sin(\pi/(4r)(t+(T/2-r))) & -T/2-r < t < -T/2+r, \\ \cos(\pi/(4r)(t-(T/2-r))) & T/2-r < t < T/2+r. \end{cases} \quad (11)$$

Given Cap, a blocking or tiling system $\{\text{Cap}_k(t)\}$ can be formed such that $\text{supp}(\text{Cap}_k(t)) \subseteq [kT-r,(k+1)T+r]$ for all k. The Cap window has several properties that make it a good basis window for signal processing purposes. For example, the Cap window has a partition property in that it windows or bounds the signal in [−T/2−r, T/2+r] and is identically 1 on [−T/2+r, T/2−r]. Additionally, the Cap window has a continuous roll-off at the endpoints, and has the property that for all $t \in \mathbb{R}$ $\Sigma[\text{Cap}_k(t)]^2 \equiv 1$.

This last condition preserves the orthogonality of basis elements between adjacent blocks. Additionally, it has $1/\omega^2$ decay in frequency space, and as a first time block is ramping down, an adjacent second block is ramping up at substantially if not exactly the same rate. The system using overlapping Cap functions can have the additional advantage of $1/\omega^2$ decay in frequency. For example, letting T=2 and r=1:

$$\text{Cap}^{\wedge}(\omega) = \left[\frac{\sin(2\pi\omega) + 4\omega\cos(4\pi\omega)}{\pi\omega(16\omega^2 - 1)}\right]. \quad (12)$$

Again, let $[f]^\circ$ be the T+2r periodization of $f$. Because of both $[f]^\circ$ and Cap have absolutely converging Fourier series, $$[\widetilde{f \cdot \text{Cap}}][n] = \sum_m [\widehat{f}]^\circ[n-m]\widetilde{\text{Cap}}[m] = [\widehat{f}]^\circ * \text{Cap}^{\wedge}[n].$$

In theory the time domain may be cut up or blocked into perfectly aligned segments so that there is no loss of information. Further, the systems are configured to be smooth, so as to provide control over decay in frequency, have variable cut-off functions for flexibility in design, and adaptive, so as to adjust accordingly to changes in frequency band. Still further, the systems can be configured, in at least some embodiments, so that the orthogonality of bases in adjacent and possible overlapping blocks is preserved.

In some embodiments, an ON Basis Window System is a set of functions $\{\mathbb{W}_k(t)\}$ such that for all $k \in \mathbb{Z}$ (i.) $\text{supp}(\mathbb{W}_k(t)) \subseteq [kT-r,(k+1)T+r]$, (ii.) $\mathbb{W}_k(t) \equiv 1$ for $t \in [kT+r,(k+1)T-r]$, (iii.) $\mathbb{W}_k$ is symmetric about its midpoint, (iv.) $\Sigma[\mathbb{W}_k(t)]^2 \equiv 1$, (v.) $\{\widetilde{\mathbb{W}_k^\circ}[n]\} \in l^1$. (13)

Conditions (i.) and (ii.) are partition properties, in that they give a snapshot of the input function $f$ on [kT+r, (k+1)T−r], with smooth roll-off at the edges. Conditions (iii.) and (iv.) preserve orthogonality between adjacent blocks. Condition (v.) provides for the computation of Fourier coefficients.

Some embodiments provide systems by translations and dilations of a given window $\mathbb{W}_1$, where $\text{supp}(\mathbb{W}_1) = [-T/2-r, T/2+r]$.

Figure 4:
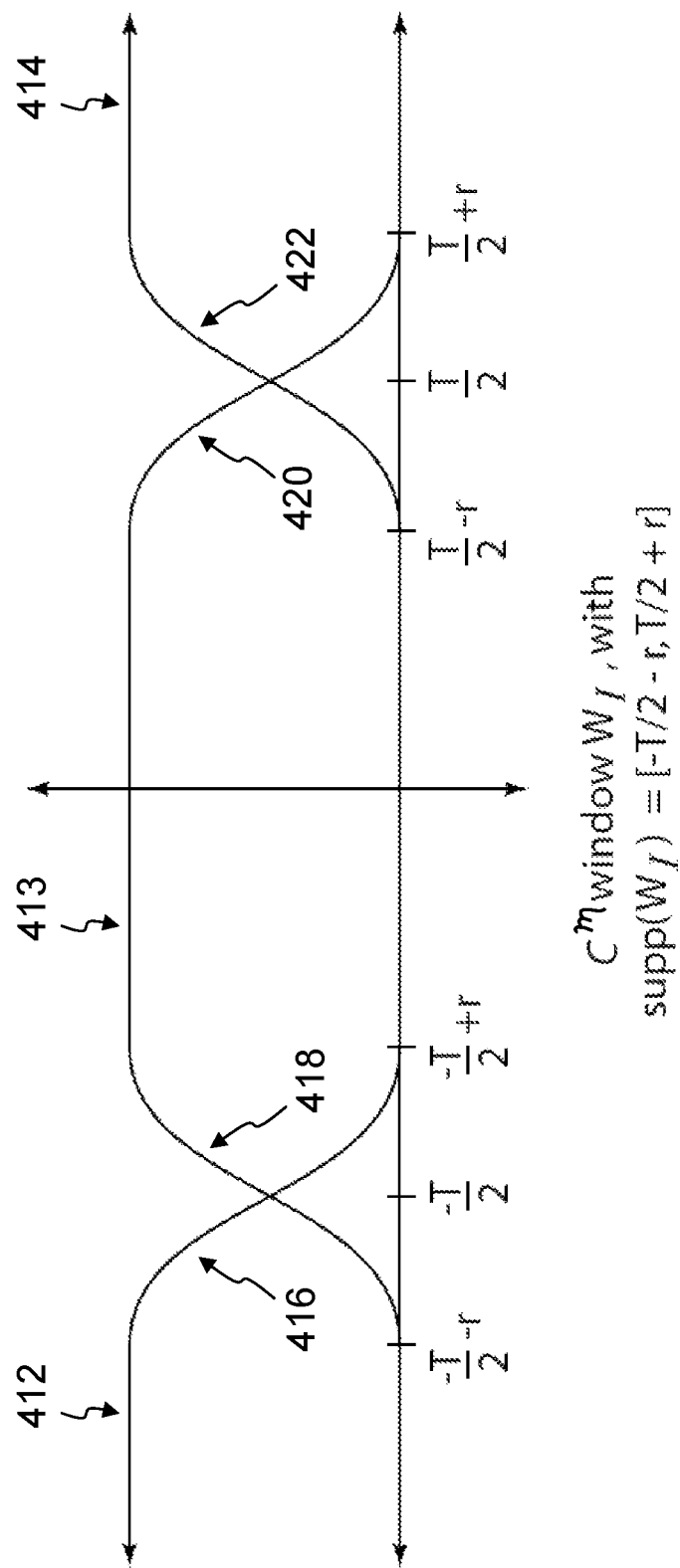
FIG. 4 shows a graphical representation of a series of basis windows, in accordance with some embodiments.

FIG. 4 shows a graphical representation of a series of windows 412-414, in accordance with some embodiments. In this representation, the windows are shows such that as a first window 412 is ramping down 416 an adjacent second window 413 is ramping up 418. Similarly, as the second window 413 is ramping down 420, a third window 414 is ramping up 422. Subsequent windows can be adaptively configured over the signal.

Condition (v.) above gives, for $f \in \mathbb{PW}_\Omega$ and $\{\mathbb{W}_k(t)\}$ an orthonormal window system with generating window $\mathbb{W}_I$, that $$\frac{1}{T+2r}\int_{-T/2-r}^{T/2+r}[f \cdot \mathbb{W}_I]^\circ(t)\exp(-2\pi i nt/[T+2r])dt = [\widehat{f}]^\circ * \widetilde{\mathbb{W}_I}[n]. \quad (14)$$

Examples $\{(\mathbb{W}_k(t)\} = \bigcup_{k \in \mathbb{Z}} \chi_{[(k)T,(k+1)T]}(t)$ $\{\mathbb{W}_k(t)\} = \bigcup_{k \in \mathbb{Z}} \text{Cap}_{[(k)T-r,(k+1)T+r]}(t)$.

The first example has jump discontinuities at segment boundaries of time blocks and has $1/\omega$ decay in frequency. The second above example is continuous but not differentiable, and has overlaps at segment boundaries of the time blocks. Further, the second system has $1/\omega^2$ decay in frequency. In some embodiments, general window function $\mathbb{W}_I$ can be k-times differentiable, can have $\text{supp}(\mathbb{W}_I) = [-T/2-r, T/2-r]$, and can have values $$\mathbb{W}_I = \begin{cases} 0 & |t| \geq T/2+r \\ 1 & |t| \leq T/2-r \\ \rho(\pm t) & T/2-r < |t| < T/2+r \end{cases}. \quad (15)$$

The ρ(t) can be solved for by solving the Hermite interpolation problem:

$$\begin{cases} (a.) & \rho(T/2-r) = 1 \\ (b.) & \rho^{(n)}(T/2-r) = 0, n = 1, 2, \ldots, k \\ (c.) & \rho^{(n)}(T/2+r) = 0, n = 0, 1, 2, \ldots, k \end{cases}$$

with the conditions that $\rho \in C^k$ and $$[\rho(t)]^2 + [\rho(-t)]^2 = 1 \text{ for } [T/2-r] \leq |t| \leq [T/2+r]. \tag{16}$$

The constraint (13) directs solutions, in some embodiments, to be expressed in terms of sin(t) and cos(t). Therefore, some embodiments solve this interpolation problem is through the method of undetermined coefficients. The below solution for ρ demonstrates that a $C^1$ window can be provided. It can initially be assumed that $$\rho(t) = A \sin(B[T/2-t]) + C, T/2 \leq t \leq T/2+r.$$

Since ρ is $C^1$, $\rho'(T/2+r)=0$; and so AB cos(B[r])=0, given $B=\pi/2r$. Window condition (iv.) above gives that $2[\rho(t/2)]^2=1$, and so $C=\sqrt{2}/2$. Finally, $\rho(T/2+r)=0$, and so $A=-\sqrt{2}/2$.

To extend ρ onto $T/2-r \leq t \leq T/2$, window condition (iv.) from above is again applied, providing $$\rho(t) = \sqrt{\left[1 - \frac{1}{2}\left[1 - \sin\left(\frac{\pi}{2r}\left(\frac{T}{2} - t\right)\right)\right]^2\right]}, \frac{T}{2} - r \leq t \leq \frac{T}{2}.$$

Further, using window conditions (ii.) and (iii.) from above providing:

$$\rho(t) = \begin{cases} \frac{\sqrt{2}}{2}\left[1 - \sin\left(\frac{\pi}{2r}\left(\frac{T}{2} - t\right)\right)\right] & \frac{-T}{2} - r \leq t \leq \frac{-T}{2}, \\ \sqrt{\left[1 - \frac{1}{2}\left[1 - \sin\left(\frac{\pi}{2r}\left(t - \frac{T}{2}\right)\right)\right]^2\right]} & \frac{-T}{2} \leq t \leq \frac{-T}{2} + r. \\ 1 & \frac{-T}{2} + r < t < \frac{T}{2} - r. \\ \sqrt{\left[1 - \frac{1}{2}\left[1 - \sin\left(\frac{\pi}{2r}\left(\frac{T}{2} - t\right)\right)\right]^2\right]} & \frac{T}{2} - r \leq t \leq \frac{T}{2}. \\ \frac{1}{\sqrt{2}}\left[1 - \sin\left(\frac{\pi}{2r}\left(t - \frac{T}{2}\right)\right)\right] & \frac{T}{2} \leq t \leq \frac{T}{2} + r, \end{cases} \tag{17}$$

Accordingly, with each degree of smoothness, an additional degree of decay in frequency may be obtained with some embodiments.

Let $m \in \mathbb{N} \cup \{0\}$ be the smoothness parameter. We can constrict a $C^m$ ON basis windowing system as follows. Let ρ be defined by the perfect spline solution of Schoenberg used in the construction of the $C^m$ partitions of unity (pp. 12-14). We will modify the Cap window, as given above. Let $$\alpha(\xi) = \rho(\pm \xi), |\xi| \leq r.$$

Let $$A = \int_{-r}^{r} \alpha(\zeta) d\zeta.$$

Now, normalize $\alpha$ by letting $$\beta(\xi) = \frac{\pi}{2A}\alpha(\xi), \tag{18}$$

and let $$\Theta(\tau) = \int_{-r}^{\tau} \beta(\xi) d\xi, |\tau| \leq r. \tag{19}$$

Define $$\rho_{up} = \sin(\Theta(t)), \tag{20}$$

$$\rho_{down} = \cos(\Theta(t)) \tag{21}$$

Define $ON_{C^m}(t)$ as follows:

$$ON_{C^m}(t) = \begin{cases} 0 & |t| \geq T/2 + r \\ 1 & |t| \leq T/2 - r \\ \rho_{up}(t + (T/2+r)) & -T/2-r < t < -T/2+r \\ \rho_{down}(t - (T/2-r))) & T/2-r < t < T/2+r \end{cases} \tag{22}$$

Again, we can translate the window as needed.

The orthogonality between time blocks is also considered with some embodiments, where orthonormal (ON) window systems $\{\mathcal{W}_k(t)\}$ are configured so that they preserve orthogonality of basis element of overlapping blocks. Because of the partition properties of these systems, the orthogonality of adjacent overlapping blocks may be checked. Some constructions involve the folding technique described by Coifman and Meyer (e.g., see R. Coifman and Y. Meyer, *Remarques sur l'analyse de Fourier a fenetre*, CR Acad. Sci. Paris 312, 259-261, 1991). Further, in some embodiments, the systems are developed constructively by using spline theory. The construction can be considered based on how the extension for a system of sines and cosines could be implemented. In some embodiments, the odd reflections can be extended about the left endpoint and the even reflections about the right.

Let $\{\varphi_j(t)\}$ be an orthonormal basis for $L^2[-T/2, T/2]$. Define $$\tilde{\varphi}_j(t) = \begin{cases} 0 & |t| \geq T/2 + r \\ \varphi_j(t) & |t| \leq T/2 - r \\ -\varphi_j(-T - t) & -T/2-r < t < -T/2 \\ \varphi_j(T - t) & T/2 < t < T/2 + r \end{cases} \tag{23}$$

Taking into consideration the orthogonality of overlapping blocks, $\{\Psi_{k,j}\} = \{\mathcal{W}_k \tilde{\varphi}_j(t)\}$ can be an orthonormal basis for $L^2(\mathbb{R})$. With $\{[\widetilde{w_l}[n]\} \in l^1$, $\mathcal{W}_l \in L^2[-T/2-r, T/2+r]$ it can follow that:

$$\|\Psi_{k,j}\|_2 = \|\mathcal{W}_l\|_2 \|\tilde{\varphi}_j\|_2 < \infty$$

Accordingly, it can be shown that $\langle \Psi_{k,j}, \Psi_{m,n}\rangle = \delta_{k,m} \cdot \delta_{j,n}$. The partitioning properties of the windows allow for limiting the checking to overlapping and adjacent windows. When k=m, the window can be considered as centered at the origin and the basis $\tilde{\varphi}_j$. It can be shown that $\langle \mathcal{W}_l \tilde{\varphi}_i, \mathcal{W}_l \tilde{\varphi}_j\rangle = \delta_{i,j}$. Computing provides:

$$\langle \mathcal{W}_l \tilde{\varphi}_i, \mathcal{W}_l \tilde{\varphi}_j\rangle = \int_{-T/2-r}^{-T/2} (\mathcal{W}_l(t))^2 \varphi_i(-T-t)\varphi_j(-T-t)dt + \tag{24}$$

-continued $$\int_{-T/2}^{-T/2+r} ((\mathbb{W}_I(t))^2 - 1)\varphi_i(t)\varphi_j(t)dt +$$

$$\int_{-T/2}^{T/2} \varphi_i(t)\varphi_j(t)dt + \int_{T/2-r}^{T/2} ((\mathbb{W}_I(t))^2 - 1)\varphi_i(t)\varphi_j(t)dt +$$

$$\int_{T/2}^{T/2+r} (\mathbb{W}_I(t))^2 \varphi_i(T-t)\varphi_j(T-t)dt.$$

Since $\{\varphi_j\}$ in an orthonormal basis, the third integral equals 1. A linear change of variables $t=-T/2-\tau$ can be applied to the first integral and $t=-T/2+\tau$ to the second integral. Adding these two integrals together provides:

$\int_0^r [(\mathbb{W}_I(T/2-\tau))^2 + (\mathbb{W}_I(\tau-T/2))^2 - 1]\varphi_i(-T/2+r)\varphi_j(-T/2+\tau)d\tau.$ Conditions (iii.) and (iv.) of our windowing system provides that the expression $[(\mathbb{W}_I(T/2-\tau))^2 + (\mathbb{W}_I(\tau-T/2))^2 - 1]$ equals zero, and therefore the above integral equals zero. Applying the linear change of variables $t=T/2-\tau$ to the fourth integral and $t=T/2+\tau$ to the fifth integral shows that these two integrals also sum to zero by essentially the same argument.

It is further verified that $(\mathbb{W}_k\tilde{\varphi}_i, \mathbb{W}_l\tilde{\varphi}_j) = \delta_{k,l} \cdot \delta_{i,j}$. Again, the partitioning properties of the widows allows for confirmation by check adjacent windows. The symmetry of the construction allows the checking of $\mathbb{W}_{-1}$ and $\mathbb{W}_0$, where the overlapping region $t \in [-r, r]$ are checked. Accordingly, the following provides:

$$\langle \mathbb{W}_{-1}\tilde{\varphi}_i, \mathbb{W}_0\tilde{\varphi}_j \rangle = 0 + \int_{-r}^{0} (\mathbb{W}_{-1}(t))\varphi_i(t)(\mathbb{W}_0(t))(-\varphi_j(-t))dt +$$

$$\int_0^r (\mathbb{W}_{-1}(t))\varphi_i(-t)(\mathbb{W}_0(t))\varphi_j(t)dt.$$

Applying the linear change of variables $t=-\tau$ to the first integral and substituting the variable $\tau$ and adding provides:

$\int_0^r [-\mathbb{W}_{-1}(-\tau)\mathbb{W}_0(-\tau) + \mathbb{W}_{-1}(\tau)\mathbb{W}_0(\tau)]\varphi_i(-\tau)\varphi_j(\tau)d\tau.$ Condition (iii.) of the windowing system provides that the expression $[-\mathbb{W}_{-1}(-\tau)\mathbb{W}_0(-\tau) + \mathbb{W}_{-1}(\tau)\mathbb{W}_0(\tau)]$ equals zero, and thus the integral equals zero. Combining these two computations shows that:

$\langle \Psi_{k,j}, \Psi_{m,n} \rangle = \delta_{k,m} \cdot \delta_{j,n}.$

Further, it can be shown that $\{\Psi_{k,j}\}$ spans $L^2(\mathbb{R})$. Given a function $f \in L^2$, the windowed element $f_k(t) = \mathbb{W}_k(t) \cdot f(t)$ can be considered. First, the expansion in the window $\mathbb{W}_I$ symmetric to the origin is considered. Let $f_1(t) = \mathbb{W}_I(t) \cdot f(t)$. The $\{\varphi_j(t)\}$ is an orthonormal basis for $L^2[-T/2, T/2]$. Given $f_I$, define $$\overline{f}_I(t) = \begin{cases} 0 & |t| \geq T/2 + r \\ f_I(t) & |t| \leq T/2 - r \\ f_I(t) - f_I(-T-t) & -T/2 - r < t < -T/2 \\ f_I(t) + f_I(T-t) & T/2 < t < T/2 + r \end{cases}. \quad (25)$$

Since $\overline{f} \in L^2[-T/2, T/2]$, it may be expanded as:

$$\sum_{j=1}^{\infty} \langle \overline{f}_I, \varphi_j \rangle \varphi_j(t).$$

To extend this to $L^2[-T/2-r, T/2+r]$, the expansion is performed according to $\{\tilde{\varphi}_j(t)\}$, getting $$\tilde{f}_I = \sum_{j=1}^{\infty} \langle \tilde{f}_I, \varphi_j \rangle \tilde{\varphi}_j(t), \quad (26)$$

where $$\tilde{f}_I(t) = \begin{cases} 0 & |t| \geq T/2 + r \\ f_I(t) & |t| \leq T/2 - r \\ f_I(t) - f_I(-T-t) & -T/2 - r < t < -T/2 + r \\ f_I(t) + f_I(T-t) & T/2 - r < t < T/2 + r \end{cases}. \quad (27)$$

Accordingly, this construction preservers orthogonality between adjacent blocks.

Additionally, with $f$ be any function in $L^2$, the windowed element $f_k(t) = \mathbb{W}_k(t) \cdot f(t)$ as considered. The construction above was repeated for this window, showing that, for fixed k, $\{\Psi_{k,j}\}$ spans $L^2([kT-r,(k+1)T+r])$ and preserves orthogonality between adjacent blocks on either side. Summing over all $k \in \mathbb{Z}$ gives that $\{\Psi_{k,j}\}$ is an orthonormal basis for $L^2(\mathbb{R})$.

Taking advantage of the above described windowing systems, some embodiments provide projection sampling. For example, adaptive frequency band (AFB) and ultra-wide-band (UWB) systems typically need either rapidly changing or very high sampling rates. These rates stress signal reconstruction in a variety of ways. For example, sub-Nyquist sampling creates aliasing error, but error would also show up in truncation, jitter and amplitude, as computation is stressed. The W-K-S sampling does not have a way to accurately reconstruct the signal for sub-Nyquist samples nor adjust the sampling rate for variable band-width signals. Accordingly, with previous sampling, truncation can lose the energy in the lost samples, aliasing can introduce ambiguous information in the signal, and extremely high sampling can increase the likelihood of jitter error. Further, perturbations of sampling sets of ultra-wideband signals can result in unstable sampling sets.

Some present embodiments, however, provide sampling for adaptive frequency band and ultra-wide-band systems. Further, some of these embodiments provide a projection method. For example, the following was considered:

Let $f$ be a signal of finite energy in the Paley-Wiener class $PW_\Omega$. For a block of time T, let $$f(t) = \sum_{k \in \mathbb{Z}} f(t)\chi_{[(k)T,(k+1)T]}(t).$$

With a given block $f_k(t) = f(t)\chi_{[(k)T,(k+1)T]}(t)$ the function can be T-periodically continued, such that:

$[f_k]^\circ(t) = [f(t)\chi_{[(k)T,(k+1)T]}(t)]^\circ.$

Expanding $(f_k)°(t)$ in a Fourier series, provides:

$$[f_k]°(t) = \sum_{n \in \mathbb{Z}} \widehat{[f_k]°}[n]\exp(2\pi i n t/T),$$

where, $$\widehat{[f_k]°}[n] = \frac{1}{T}\int_{(k)T}^{(k+1)T} f(t)\exp(-2\pi i n t/T)dt.$$

The original function $f$ is $\Omega$ band-limited. However, the truncated block functions $\beta_k$ are not. Using the original $\Omega$ band-limit gives a lower bound on the number of non-zero Fourier coefficients $[\widehat{f_k}° n]$ as follows:

$$\frac{n}{T} \leq \Omega, \text{ i.e., } n \leq T \cdot \Omega.$$

Accordingly, $N = \lceil T \cdot \Omega \rceil$ is chosen, where $\lceil \cdot \rceil$ denotes a ceiling function. For this choice of N, the following is computed:

$$f(t) = \sum_{k \in \mathbb{Z}} f(t)\chi_{[(k)T,(k+1)T]}(t)$$

$$= \sum_{k \in \mathbb{Z}} [[f_k]°(t)]\chi_{[(k)T,(k+1)T]}(t)$$

$$\approx \sum_{k \in \mathbb{Z}} \left[\sum_{n=-N}^{n=N} \widehat{[f_k]°}[n]\exp(2\pi i n t/T)\right]\chi_{[(k)T,(k+1)T]}(t).$$

It is noted that for this choice of the standard (sines, cosines) basis, it can be, for a fixed value of N, adjusted to a large bandwidth $\Omega$ by choosing small time blocks T. Also, after a given set of time blocks, an increase or decrease in bandwidth $\Omega$ can be accommodated by again adjusting the time blocks, e.g., given an increase in $\Omega$, decrease T, and vice versa. These adjustments may result in the quality of the signal, as expressed in the accuracy the representation of $f$, depends on N, $\Omega$, and T.

Accordingly, the basic projection formula in accordance with some embodiments is given as follows. Let $f \in \mathbb{PW}_\Omega$ a and let T be a fixed block of time. Then, for $N = \lceil T \cdot \Omega \rceil$, $$f(t) \approx f_{proj}(t) = \sum_{k \in \mathbb{Z}} \left[\sum_{n=-N}^{N} \widehat{[f_k]°}[n]\exp(2\pi i n t/T)\right]\chi_{[kT,(k+1)T]}(t). \quad (28)$$

This can be shows as follows: again, let $f \in \mathbb{PW}_\Omega$ and fix a block T, and providing that:

$$f(t) = \sum_{k \in \mathbb{Z}} f(t)\chi_{[kT,(k+1)T]}(t).$$

On each time block, periodically extend the function to a T-periodic function, getting $$[f_k]°(t) = [f(t)\chi_{[kT,(k+1)T]}(t)]°(t).$$

Since $[f_k]°(t)$ is a periodic function, it can be expanded into Fourier series $$[f_k]°(t) = \sum_{n \in \mathbb{Z}} \widehat{[f_k]°}[n]\exp(2\pi i n t/T),$$

where the coefficients $[\widehat{f_k}°[n]$ are defined by $$\widehat{[f_k]°}[n] = \frac{1}{T}\int_{(k)T}^{(k+1)T} f(t)\exp(-2\pi i n t/T)dt.$$

Due to the fact the $f$ is $\Omega$ band-limited, it can be estimated that the value of n for which $[\widehat{f_k}°[n]$ is non-zero. At minimum, $[\widehat{f_k}°[n]$ is non-zero if $$\frac{n}{T} \leq \Omega, \text{ or equivalently, } n \leq T \cdot \Omega. \quad (29)$$

Let $$N = \lceil T \cdot \Omega \rceil \quad (30)$$

Summing provides $$f(t) \approx f_{proj}(t) = \sum_{k \in \mathbb{Z}} \left[\sum_{n=-N}^{N} \widehat{[f_k]°}[n]\exp(2\pi i n t/T)\right]\chi_{[kT,(k+1)T]}(t).$$

It is now evident how this method approximates the signal. Unlike the Shannon method which examined the function at specific points, then used those individual points to recreate the curve, the projection method in accordance with at least some embodiments breaks the signal into time blocks and then approximates their respective periodic expansions with a Fourier series. This process allows the system to individually evaluate each piece and base its calculation on the needed bandwidth. The individual Fourier series are then summed, recreating a close approximation of the original signal. It is noted that instead of fixing T, the method allows for the fixing of any of the three variables (N, T and/or $\Omega$) while allowing the other two to fluctuate. From the design point of view, in some implementations the easiest and most practical parameter to fix may be N. For situations in which the bandwidth does not need flexibility, it may be beneficial to fix $\Omega$ and/or T based on the equation $N = \lceil T \cdot \Omega \rceil$. However, if greater bandwidth $\Omega$ is need, shorter time blocks T may be selected.

The projection method can adapt to changes in the signal. For example, consider that the signal $f(t)$ has a band-limit $\Omega(t)$ that changes with time. This change effects the time blocking $\tau(t)$ and the number of basis elements $N(t)$. This may make the analysis more complicated, but demonstrates at least some of the advantage of the projection method provided by some embodiments over conventional methods.

For example, during a given $\tau(t)$, let $\overline{\Omega}(t) = \max\{\Omega(t): t \in \tau(t)\}$. For a signal $f$ that is $\Omega(t)$ band-limited, the value of n can be estimated for which $[\widehat{f_k}°[n]$ is non-zero. At minimum, $[\widehat{f_k}°[n]$ is non-zero if:

$$\frac{n}{\tau(t)} \leq \overline{\Omega}(t), \text{ or equivalently, } n \leq \tau(t) \cdot \overline{\Omega}(t).$$

Let $$N(t)=\lceil \tau(t)\cdot \overline{\Omega}(t) \rceil.$$

For this choice of N(t), the basic adaptive projection formula is obtained.

The projection method also adapts to general orthonormal systems, much as Kramer-Weiss extends sampling to general orthonormal bases. For example, let $f$, $\hat{f} \in L^2(\mathbb{R})$ and $f$ have a variable but bounded band limit $\Omega(t)$. Let $\tau(t)$ be an adaptive block of time. Given $\tau(t)$, let $\overline{\Omega}(t)=\max\{(\Omega(t):t\in\tau(t)\}$. Then $N(t)=\lceil \tau(t)\cdot\overline{\Omega}(t)\rceil$, $f(t)\approx f\rho(t)$, where $$f_P(t) = \sum_{k\in\mathbb{Z}} \left[\sum_{n=-N(t)}^{N(t)} \hat{f_k}[n]e^{(2\pi int/\tau)}\right]\chi_{[kT,(k+1)T]}(t). \quad (31)$$

Further, given a function $f$ such that $f \in \mathbb{PW}_\Omega$, let T be a fixed time block. Define $f(t)$ and $f_k(t)$ as in the beginning of the computation above. Now let $\{\varphi_j\}$ be a general orthonormal system for $L^2[0,T]$ indexed by $\mathbb{N}$ and let $\{\varphi_{k,j}(t)\}=\{\varphi_j(t-kT)\}$. Sing $f\in \mathbb{PW}_\Omega$, there exists $N=N(T,\Omega)$ such that $\hat{f_k}[j]=\langle f,\varphi_{k,j}\rangle =0$ for all n>N. In fact, let $N=\max_j\langle f,\varphi_{k,j}\rangle \ne 0$. Expanding in a Fourier series
relative to $\{\varphi_{k,j}\}$ gives $f_k(t)=\Sigma_{j\in\mathbb{N}} \hat{f_k}[j]\varphi_{k,j}(t)$,
where $\hat{f_k}[j]=\langle f_k,\varphi_{k,j}\rangle$. (32)

Summing over all blocks gives that $f(t)\approx f\rho(t)$, where $$f_P(t) = \sum_{k=-\infty}^{\infty}\left[\sum_{j=1}^{N} \langle f_k,\varphi_{k,j}\rangle\varphi_{k,j}(t)\right]\chi_{[kT,(k+1)T]}(t). \quad (33)$$

Accordingly, given characteristics of the class of input signals, the choice of basis functions used in the projection method can be tailored to optimal representation of the signal or a desired characteristic in the signal.

Further, some embodiments provide for the projection formula for orthonormal windowing. For consistency, except for sines and cosines, and exponentials ($\exp(\theta)=\cos(\theta)+i\sin(\theta)$), we index with the natural numbers $\mathbb{N}$ Let $\{\mathbb{W}_k(t)\}$ be an ON Window System, and let $\{\Psi_{k,j}\}$ be an orthonormal basis that preserves orthogonality between adjacent windows. Let $f\in\mathbb{PW}_\Omega$ and $N=N(T,\Omega)$ be such that $\langle f, \Psi_{k,j}\rangle =0$ for all N and all k. Then, $f(t)\approx f\rho(t)$, where $$f_P(t) = \sum_{k\in\mathbb{Z}}\left[\sum_{j=1}^{N}\langle f, \Psi_{k,j}\rangle\Psi_{k,j}(t)\right]. \quad (34)$$

Given the flexibility of the windowing systems, some embodiments further provide for an adaptive projection system for the orthonormal window systems. Let $f$, $\hat{f}\in L^2(\mathbb{R})$ and $f$ have a variable but bounded band-limit $\Omega(t)$. Let $\tau(t)$ be an adaptive block of time. Let $\{\mathbb{W}_k(t)\}$ be a ON basis window system with window size $\tau(t)+2r$ on the kth block, and let $\{\Psi_{k,j}\}$ be an orthonormal basis that preserves orthogonality between adjacent windows.

Given $\tau(t)$, let $\overline{\Omega}(t)=\max\{\Omega(t): t\in\tau(t)\}$. Let $N(t)=N(\tau(t),\Omega(t))$ be such that $\langle f, \Psi_{k,j}\rangle =0$ for all $j>N(t)$. Then, $f(t)\approx f\rho(t)$, where $$f_P(t) = \sum_{k\in\mathbb{Z}}\left[\sum_{j=1}^{N(t)}\langle f, \Psi_{k,j}\rangle\Psi_{k,j}(t)\right]. \quad (35)$$

The development of a $C^1$ system involves solving a Hermite interpolation problem for not only the window but also the folded basis elements. Using undetermined coefficients $\rho$ can be solved for so that the window is $C^1$, getting $$\rho(t) = \begin{cases} \sqrt{\left[1-\frac{1}{2}\left[1-\sin\left(\frac{\pi}{2r}\left(\frac{T}{2}-t\right)\right)\right]^2\right]} & \frac{T}{2}-r\le t \le \frac{T}{2}. \\ \frac{1}{\sqrt{2}}\left[1-\sin\left(\frac{\pi}{2r}\left(t-\frac{T}{2}\right)\right)\right] & \frac{T}{2}\le t \le \frac{T}{2}+r. \end{cases}$$

Use the same technique can be used to solve for $C^1$ folded basis elements $\{\widetilde{\varphi_j}\}$. The constraints that make $C^1$ folded basis elements are $$\begin{cases} (a.) & \varphi_j(-T/2)=0 \\ (b.) & \varphi'_j(-T/2) \text{ exists} \\ (c.) & \varphi'_j(T/2)=0 \end{cases} \quad (36)$$

The constraint (29) can direct to solutions expressed in terms of sin(t) and cos(t).

Solving the constraints (29) for $\varphi_j$, provides:

$$\varphi_j(t) = \sqrt{\frac{2}{T}} \sin\left(\pi(k+1/2)\frac{(t+T/2)}{T}\right) \quad (37)$$

$\{\Psi_{k,j}\} = \{\mathbb{W}_k\widetilde{\varphi_j}(t)\}$, where $$\mathbb{W}_l = \begin{cases} 0 & |t|\ge T/2+r \\ 1 & |t|\le T/2-r \\ \rho(\pm t) & T/2-r<|t|<T/2+r \end{cases},$$

with $$\rho(t) = \begin{cases} \sqrt{\left[1-\frac{1}{2}\left[1-\sin\left(\frac{\pi}{2r}\left(\frac{T}{2}-t\right)\right)\right]^2\right]} & \frac{T}{2}-r\le t \le \frac{T}{2}. \\ \frac{1}{\sqrt{2}}\left[1-\sin\left(\frac{\pi}{2r}\left(t-\frac{T}{2}\right)\right)\right] & \frac{T}{2}\le t \le \frac{T}{2}+r, \end{cases}$$

and $$\varphi_j(t) = \sqrt{\frac{2}{T}} \sin\left(\pi(k+1/2)\frac{(t+T/2)}{T}\right).$$

Let $\mathcal{T}_\alpha$ be the translation operator, i.e., $\mathcal{T}_\alpha[f](t)=f(t-\alpha)$. In the following, $\mathbb{W}_k(t)$ is an ON window centered at the origin, $\varphi_j$ is a basis element in that window, $\widetilde{\varphi_j}$ is the folded basis element, $m\in\mathbb{N}\cup\{0\}$ is the smoothness parameter, $k\in\mathbb{Z}$ is the translation parameter, and $j\in\mathbb{Z}$ is the index for elements in a given ON basis. Note, in each windowed basis element $\Psi_{k,j}$, the windowing index k goes first, the index j of the original or folded basis element goes second. The initial signal segmentation (denoted by $\mathbb{S}_k$) and the ON basis window system (denoted by $\mathbb{W}_k$) is included in each example.

$\{\Psi_{k,j}\} = \{\mathcal{T}_{[(k)T+T/2]}[\mathbb{W}_I \varphi_j](t)\}$, where $\mathbb{W}_I(t) = \chi_{[-T/2,T/2]}(t)$ and $$\varphi_j(t) := \exp\left(i\frac{2\pi j}{T}(t + T/2)\right).$$

Note, we are using Euler's formula $$\exp(i\theta) = \cos(\theta) + i\sin(\theta).$$

In this simple example, $\mathbb{S}_I(t) = \mathbb{W}_I(t) = \chi_{[-T/2,T/2]}(t)$ A $C^0$ (continuous) system—

$\mathbb{S}_k = \chi_{[(k)T-r,(k+1)T+r]}$, $\{\Psi_{k,j}\} = \{\mathcal{T}_{[(k)T+T/2]}[\mathbb{W}_I \widetilde{\varphi_j}](t)\}$ and $$\varphi_j(t) = \sqrt{\frac{2}{T}} \sin\left(\pi(j+1/2)\frac{(t+T/2)}{T}\right)$$

The first example has jump discontinuities at all segment boundaries and has $\mathcal{O}(1/\omega)$ decay in frequency. Note, as there is no overlap, basis elements are not folded. The second is continuous but not differentiable, and has overlaps at segment boundaries. This system has $\mathcal{O}(1/\omega)$ decay in frequency.

A $C^1$ system—

$\mathbb{S}_k = \chi_{[(k)T-r,(k+1)T+r]}$, $\{\Psi_{k,j}\} = \{\mathcal{T}_{[(k)T+T/2]}[\mathbb{W}_I \widetilde{\varphi_j}](t)\}$, where $$\mathbb{ON}_I = \begin{cases} 0 & |t| \geq T/2+r \\ 1 & |t| \leq T/2-r \\ \rho(\pm t) & T/2-r < |t| < T/2+r \end{cases},$$

with $$\rho(t) = \begin{cases} \sqrt{1 - \frac{1}{2}\left[1 - \sin\left(\frac{\pi}{2r}\left(\frac{T}{2} - t\right)\right)\right]^2} & \frac{T}{2} - r \leq t \leq \frac{T}{2} \\ \frac{1}{\sqrt{2}}\left[1 - \sin\left(\frac{\pi}{2r}\left(t - \frac{T}{2}\right)\right)\right] & \frac{T}{2} \leq t \leq \frac{T}{2} + r \end{cases}$$

and $$\varphi_j(t) = \sqrt{\frac{2}{T}} \sin\left(\pi(j+1/2)\frac{(t+T/2)}{T}\right).$$

A $C^m$ system for both UWB and AFB systems—

$\mathbb{S}_k = \chi_{[(k)T-r,(k+1)T+r]}$, $\{\Psi_{k,j}\} = \{\mathcal{T}_{[(k)T+T/2]}[\mathbb{W}_I \widetilde{\varphi_j}](t)\}$ and $$\varphi_j(t) = \sqrt{\frac{2}{T}} \sin\left(\pi(j+1/2)\frac{(t+T/2)}{T}\right).$$

The basis $\{\varphi_j\}$ is relatively easy to construct, and can be used for both UWB and AFB systems.

A $C^m$ system designed especially for UWB systems can include—

$\mathbb{S}_k = \chi_{[(k)T-r,(k+1)T+r]}$, $\{\Psi_{k,j}\} = \{\mathcal{T}_{[(k)T+T/2]}[\mathbb{W}_I \widetilde{\varphi_j}](t)\}$, where $\mathbb{W}_I(t) = \mathbb{ON}_{C^m}(t)$ and $$\varphi_j = \mathcal{C}_j^\nu(t;T) := \sqrt{\frac{2w\left(\frac{2t}{T};\nu\right)}{Th_j^\nu}} C_j^\nu\left(\frac{2t}{T}\right).$$

Here, the $\mathcal{C}_j^\nu(t; T)$ are modified Gegenbauer functions constructed using Gegenbauer polynomials. The Gegenbauer polynomials are modified so that they zero-out at the endpoints, and normalized to create an ON system. This then allows UWB signals to be expanded in the projection method using the modified Gegenbauer system. The basis $\{\mathcal{C}_j^\nu(t; T)\}$ is more difficult to construct, but is very good with respect to minimizing the "ringing" present in all windowed bases. (See, for example, D. Gottleib and C.-W. Shu, On the Gibbs phenomena and its resolution, SIAM Rev. 39 (4), 644-668, 1997.) The modified Gegenbauer system minimizes $\mathcal{E}_{k_p}$. This improves performance of this system for UWB signals.

The Gegenbauer polynomials $C_n^\nu : \mathbb{C} \to \mathbb{C}$ are orthogonal over $(-1, 1)$ with orthogonality relation given by [Table 18.3.1] in NIST Publication—F. W. J. Olver, D. W. Lozier, R. F. Boisvert, and C. W. Clark, NIST handbook of mathematical functions, Cambridge University Press, Cambridge, 2010.

$$\int_{-1}^{1} C_n^\nu(x) C_m^\nu(x) w(x;\nu) dx = h_n^\nu \delta_{n,m}, \tag{38}$$

for $\nu \in (-1/2, \infty)\{0\}$, where $$w(x;\nu) := (1-x^2)^{\nu-1/2}, \tag{39}$$

$$h_n^\nu := \frac{2^{1-2\nu}\pi\Gamma(2\nu+n)}{(\nu+n)\Gamma^2(\nu)n!}, \tag{40}$$

the gamma function $\Gamma : \mathbb{C} \setminus \mathbb{N}_0 \to \mathbb{C}$ is defined by National Institute of Standards of Technology (NIST)(Chapter 5), and $\mathbb{N}_0 := \{0, 1, 2, \ldots\}$. The Gegenbauer polynomials are defined using the Gauss hypergeometric function ([(18.5.9)] (NIST)) as $$C_n^\nu(x) := \frac{(2\nu)_n}{n!} {}_2F_1\left(\begin{matrix} -n, 2\nu+n \\ \nu+\frac{1}{2} \end{matrix}; \frac{1-x}{2}\right),$$

where the Pochhammer symbol $(\bullet)_n : \mathbb{C} \to \mathbb{C}$ for $n \in \mathbb{N}_0$ is defined by $(\alpha)_n := (\alpha)(\alpha+1) \ldots (\alpha+n-1)$, and the Gauss hypergeometric function is defined in ([Chapter 15](NIST)). They have a Rodrigues-type formula ([Table 18.5.1](NIST))

$$C_n^\nu(x) := \frac{(-1)^n (2\nu)_n}{2^n \left(\nu + \frac{1}{2}\right)_n n!} \frac{1}{w(x;\nu)} \frac{d^n}{dx^n} w(x;\nu+n),$$

and can also be computed using three-term recurrence relations ([Table 18.9.1](NIST)). Note that Gegenbauer polynomials can be given in terms of the more general Jacobi polynomials symmetric in parameters with ([(18.7.1)](NIST))

$$C_n^v(x) = \frac{(2v)_n}{\left(v+\frac{1}{2}\right)_n} P_n^{(v-1/2,v-1/2)}(x).$$

Consider the modified Gegenbauer function $\mathcal{C}_n^v$: $[-T/2, T/2] \times (0, \infty) \to \mathbb{R}$ defined by $$C_n^v(t;T) := \sqrt{\frac{2w\left(\frac{2t}{T};v\right)}{Th_n^v}} C_n^v\left(\frac{2t}{T}\right).$$

It follows from (38) that these functions form an ON basis for $L^2[-T/2,T/2]$ with $v \in (\frac{1}{2}, \infty)$, namely $$\int_{-T/2}^{T/2} \mathcal{C}_n^v(t;T) \mathcal{C}_m^v(t;T) dt = \delta_{m,n}.$$

Note that we exclude the parameters $v \in (-\frac{1}{2}, \frac{1}{2}]$ in order to keep the endpoints $\pm L/2$ in the domain of integration. By using (39), (40), and indexing by the basis index j, one has $$C_j^v(t;T) = \frac{2^{2v-1/2}\Gamma(v)}{T^v}\sqrt{\frac{(j+v)j!}{\pi\Gamma(2v+j)}} \times \left(\left(\frac{T}{2}\right)^2 - t^2\right)^{v/2-1/4} C_j^v\left(\frac{2t}{T}\right). \quad (41)$$

The computations become increasingly complex as the parameter k increases. Accordingly, some embodiments provide for an "almost orthogonal" windowing systems using B-spline constructions. These B-spline constructions allow for a direct computation of the Fourier coefficients.

The analysis of the error generated by the projection method involves looking at the decay rates of the Fourier coefficients. Working with the standard basis, for $f \in C(\mathbb{T}_{2\Phi})$, the modulus of continuity can be defined as:

$$\mu(\delta) = \sup_{|x-y|\le\delta} |f(x) - f(y)|,$$

and have that $$|\hat{f}[n]| \le \frac{1}{2}\mu(1/n).$$

We say that $f$ satisfies a Hölder condition with exponent $\alpha$ when there exists a constant K such that $$|f(x+\delta) - f(x)| \le K\delta^\alpha.$$

When $f$ is k-times continuously differentiable and $f^k$ satisfies a Hölder condition with exponent $\alpha$, then there exists a constant K such that $$|\hat{f}[n]| \le K\frac{1}{n^{k+\alpha}}.$$

The sharp cut-offs $\chi_{[kT,(k+1)T]}$ have a decay of only $1/\omega$ in frequency. The orthonormal ON windowing systems can be designed so that the windows have decay $1/\omega^{k+2}$ in frequency. Thus, this can make the error on each block summable.

Let m be the smoothness parameter of an ON basis windowing system. Assuming $\mathbb{W}_k$ is $C^m$, $\widehat{\mathbb{W}_k}(\omega) = \mathcal{O}(1/(\omega)^{m+2})$. We will analyze the error $\mathcal{E}_{k_p}$ on a given block. Let $M = \|(f \cdot \mathbb{S}_k)\|_2$. Then $$\varepsilon_{kp} = \left\| f(t) \cdot \mathbb{W}_k - \left[\sum_{j=1}^N \langle f, \Psi_{k,j}\rangle \Psi_{k,j}(t)\right] \mathbb{W}_k(t) \right\|_2$$

$$= \left\|\sum_{j>N} \langle f, \Psi_{k,j}\rangle \Psi_{k,j}(t) \mathbb{W}_k(t)\right\|_2 \le \left[\sum_{j>N} \frac{M}{n^{m+2}}\right].$$

The projection method according to at least some embodiments can be applied with binary signals. For example, the Walsh functions $\{Y_n\}$ form an orthonormal basis for $L^2[0, 1]$. The basis functions have the range $\{1, -1\}$, with values determined by a dyadic decomposition of the interval. The Walsh functions are of modulus 1 everywhere. The functions are given by the rows of the unnormalized Hadamard matrices, which are generated recursively by $$H(2) = \begin{bmatrix} 1 & 1 \\ 1 & -1 \end{bmatrix}$$

$$H(2^{(k+1)}) = H(2) \otimes H(2^k) = \begin{bmatrix} H(2^k) & H(2^k) \\ H(2^k) & -H(2^k) \end{bmatrix}$$

It is noted that although the rows of the Hadamard matrices give the Walsh functions, the elements have to be reordered into sequency order. The components are typically arranged in ascending order of zero crossings (see for example K. G. Beauchamp, Applications of Walsh and Related Functions, Academic Press, London, 1984). The Walsh functions can also be interpreted as the characters of the group G of sequences over $\mathbb{Z}_2$, i.e., $G = (\mathbb{Z}_2)^N$. The Walsh basis is a well-developed system for the study of a wide variety of signals, including binary. The projection method according to some present embodiments works with the Walsh system to create a wavelet-like system to do signal analysis.

First, assume that the time domain is covered by a uniform block tiling $\chi_{[kT,(k+1)T]}(t)$. Note in this section, signal segmentation and basis windowing are the same. The function can be translated and/or scaled on this kth interval back to [0, 1] by a linear mapping. Denote the resultant mapping as $f_k$, which is an element of $L^2[0, 1]$. Given that $f \in \mathbb{PW}_\Omega$, there exists an $N>0$ ($N=N(\Omega)$) such that $\langle f_k, Y_n\rangle = 0$ for all $n>N$. The decomposition of $f_k$ into Walsh basis elements is $$\sum_{n=0}^N \langle f_k, Y_n\rangle Y_n.$$

Translating and summing up gives a projection representation $f\rho_\tau$ $$f_\mathcal{P}(t) = \sum_{k \in \mathbb{Z}} \left[\sum_{n=0}^N \langle f_k, Y_n\rangle Y_n\right] \lambda_{[kT,(k+1)T]}(t). \quad (42)$$

The windowing system results in limited or substantially no loss of signal data and orthogonality between signal blocks. Similarly, an orthonormal window system may be used with fixed T and/or adaptive r window length. Again, the function $f \cdot \mathbb{W}_k(t)$ can be translated and/or scaled on this kth window back to [0, 1] by a linear mapping. The resultant mapping can be denoted as $f_{k_r}$. The resultant function is an element of $L^2[0, 1]$. Given that $f \in \mathbb{PW}_\Omega$, there exists an M>0 (M=M(Ω)) such that $\langle f_{k_r}, \Upsilon_n \rangle$ for all n>M. The decomposition of $f_{k_r}$ into Walsh basis elements is $$\sum_{n=0}^{M} \langle f_{k_r}, \Upsilon_n \rangle \Upsilon_n.$$

Again, translating and summing up gives the projection representation $f \rho_\tau$ $$f_{\mathcal{P}_W}(t) = \sum_{k \in \mathbb{Z}} \left[ \sum_{n=0}^{N} \langle f_{k_r}, \Upsilon_n \rangle \Upsilon_n \right] W_k(t). \quad (43)$$

Some embodiments simply provide processing by almost maintaining the orthogonality between windows. The partition of unity systems do not preserve orthogonality between blocks when implementing the almost orthogonality. However, they are typically easier to compute and typically easier to build in circuitry and/or ASICs. Therefore, these systems can be used to approximate the Cap system with B-splines. Using these approximations, basis windowing systems can be provided that nearly preserve orthogonality. In many instances, each added degree of smoothness in time can add to the degree of decay in frequency.

The concept of almost maintaining orthogonality allows some embodiments to create windowing systems that are more computable, and in some instance can be more easily constructed or implemented (e.g., through circuitry, hardware and/or software), such as the Bounded Adaptive Partition of Unity systems $\{\mathbb{B}_k(t)\}$ with the orthogonality preservation of the ON Window System $\{\mathbb{W}_k(t)\}$. For example, $\{\mathbb{W}_k(t)\} = \bigcup_{k \in \mathbb{Z}} \text{Cap}_{[(k)T-r,(k+1)T+r]}(t)$ was considered, where $$\text{Cap}_I(t) = \begin{cases} 0 & |t| \geq T/2 + r, \\ 1 & |t| \leq T/2 - r, \\ \sin(\pi/(4r)(t + (T/2 + r))) & -T/2 - r < t < -T/2 + r, \\ \cos(\pi/(4r)(t - (T/2 - r))) & T/2 - r < t < T/2 + r. \end{cases}$$

Let 0<r<<T, an almost orthonormal (ON) System for adaptive and ultra-wide band sampling in accordance with some embodiments provides a set of functions $\{\mathbb{A}_k(t)\}$ for which there exists δ, 0≤δ≤½, such that (i.) $\text{supp}(\mathbb{A}_k(t)) \subseteq [kT - r, (k + 1)T + r]$ for all $k$, (44)

(ii.) $\mathbb{A}_k(t)) \equiv 1$ for $t \in [kT + r, (k + 1)T - r]$ for all $k$, (iii.) $\mathbb{A}_k((kT + T/2) - t) = \mathbb{A}_k(t - (kT + T/2))$, $t \in [0, T/2 + r]$, (iv.) $1 - \delta \leq \sum_k [\mathbb{A}_k(t)]^2 \leq 1 + \delta$, (v.) $\{\widehat{\mathbb{A}_k}[n]\} \in l^1$.

Accordingly, some embodiments start with $\bigcup_{k \in \mathbb{Z}} \text{Cap}_{[(k)T-r,(k+1)T+r]}(t)$. These embodiments can place equidistant knot points $-T/2 - r < t < -T/2 + r$ and $T/2 - r < t < T/2 + r$, and approximate sin, cos in those intervals with $C^m$ B-splines. For these systems, δ→0 as k increases. The partition of unity systems typically do not preserve orthogonality between blocks relative to the almost orthogonality embodiments. However, they are typically easier to compute and they can be easier to build in circuitry. Therefore, these systems can be used to approximate the Cap system with B-splines. These embodiments can provide basis windowing systems that nearly preserve orthogonality. Each added degree of smoothness in time adds to the degree of decay in frequency.

Figure 5:
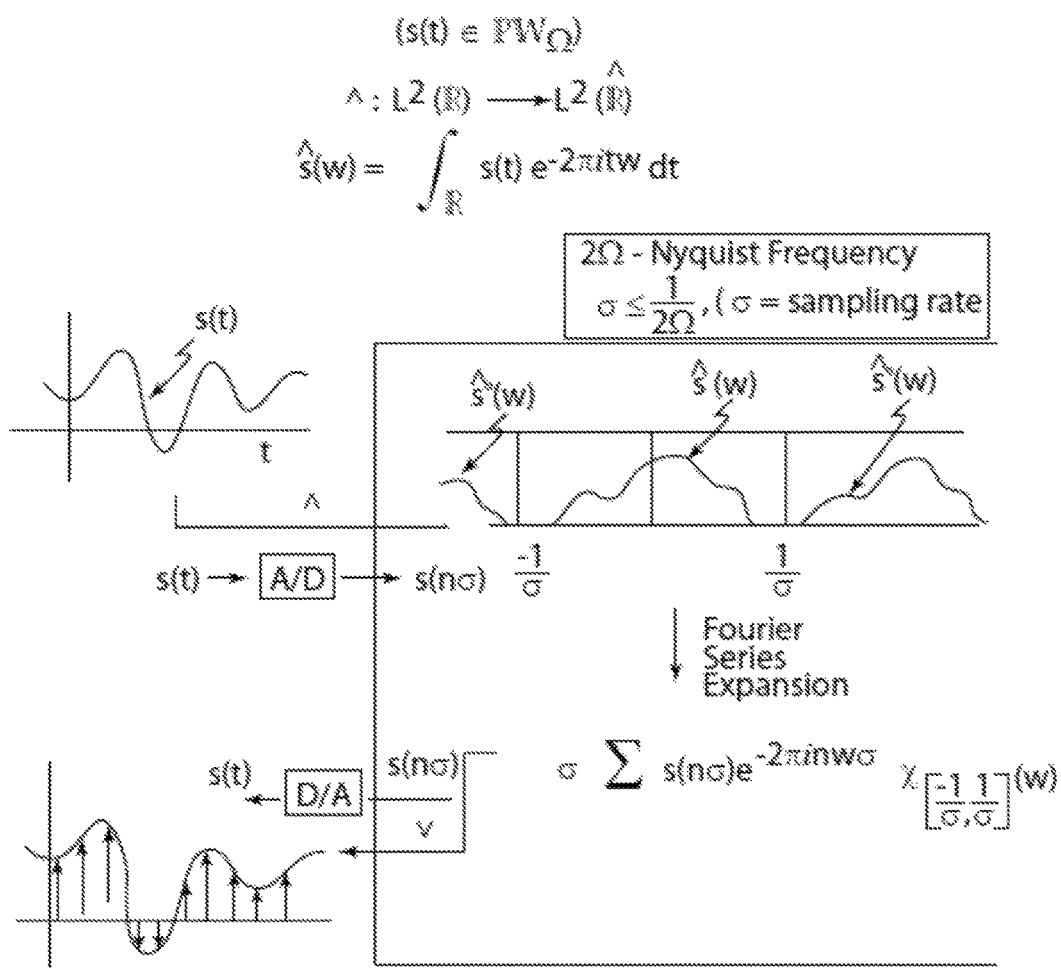
FIG. 5 shows an example sampling technique in accordance with a standard Shannon (W-K-S) sampling.

As such, the present embodiments provide windowing systems for time-frequency analysis that can have variable partitioning length, variable roll-off and/or variable smoothness. This variability is distinct from other standard sampling techniques, such as the standard Shannon (W-K-S) sampling that effectively provides a signal stationary point-of-view. FIG. 5 shows an example sampling technique in accordance with a standard Shannon (W-K-S) sampling. This sampling represents a signal stationary point-of-view sampling that is limited to a fixed sampling rate with rigid boundaries.

Referring back to FIG. 2, some embodiments are configured to provide for a projection method of processing a signal. A signal is initially segmented in step 212. Again, the segmenting can be provided through an adaptive segmenting.

Figure 6A:
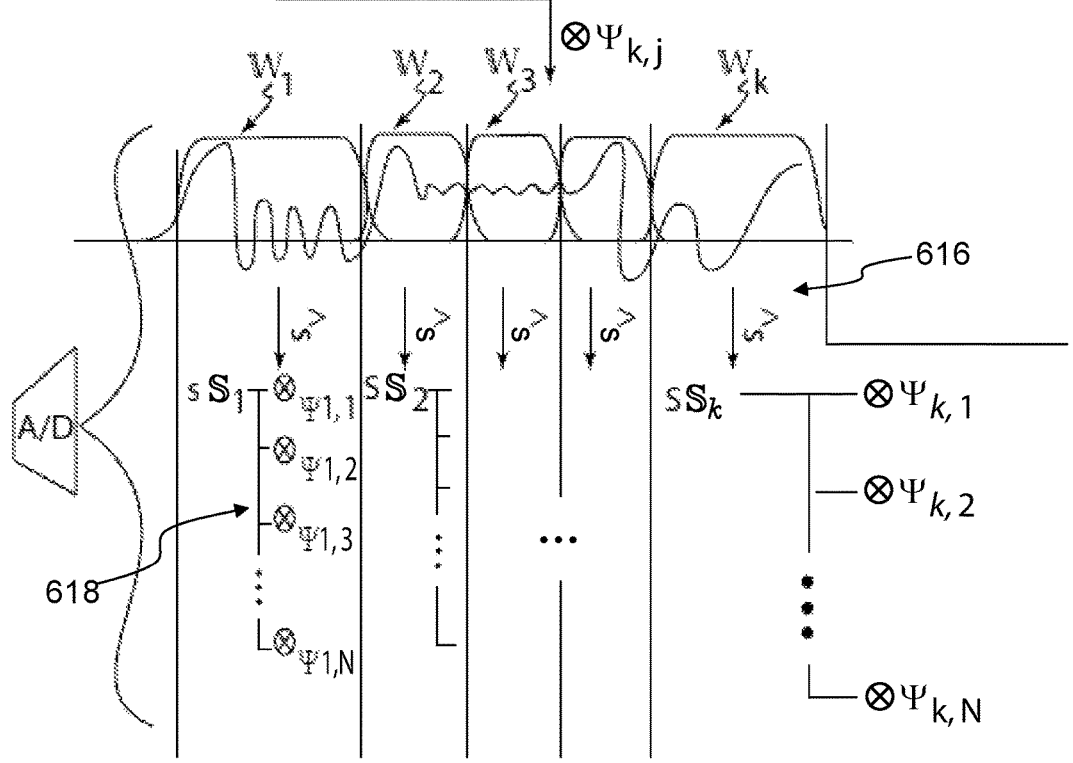
FIGS. 6A-6B show simplified graphical representations of a method of projection sampling in accordance with some embodiments.
Figure 6B:
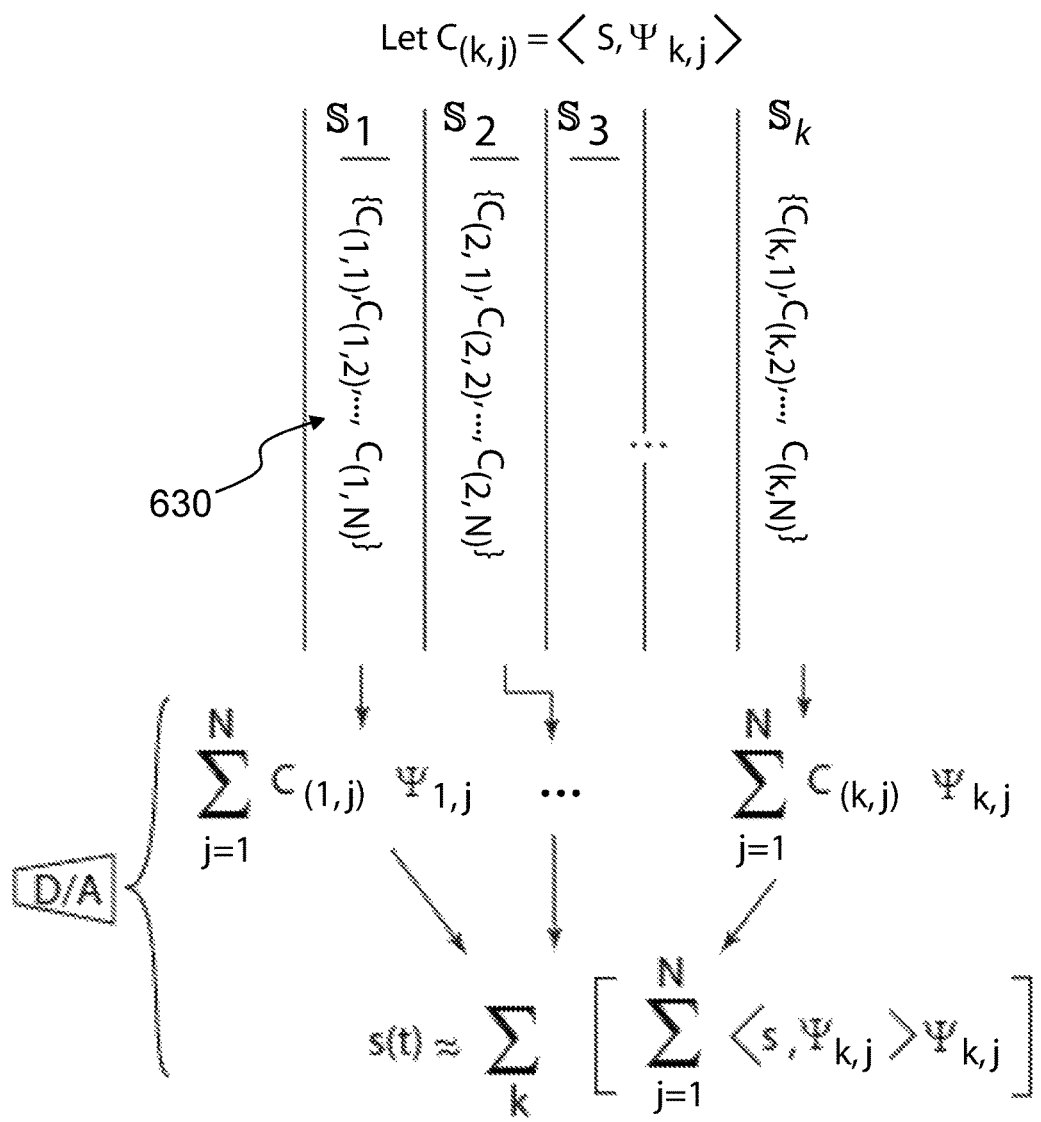

FIGS. 6A-6B show simplified graphical representations of a method of projection sampling in accordance with some embodiments. Referring to FIG. 6A, a signal s(t) 610 is received, which can have variable bandwidth over the duration of the signal. For example, the signal s(t) 610 can be similar to the signal 310 of FIG. 3A, and can include a high frequency burst 612. As described above, the projection sampling includes the partitioning of the signal into a plurality of the segments $s(t) \cdot \mathbb{S}_k$, such as $\mathbb{S}_1, \mathbb{S}_2, \mathbb{S}_3 \ldots \mathbb{S}_k$. In some embodiments, the partitioning can provide for adaptive windows where the windows can be adaptive based on $N=\lceil T \cdot \Omega \rceil$, which can in at least some instances accommodate the variations in the signal bandwidth.

The segments are processed to perform a transform series expansions, for example, through Fourier series 616 providing transform coefficients 618 $(s \cdot \mathbb{S}_k \mathbb{S} \Psi_{k,j} = \langle s, \Psi_{k,j} \rangle)$ in the frequency domain relative to the respective windows and in accordance with the number of basis elements (N) corresponding to the respective window (k). As described above, in some implementations the number of basis elements N is defined according to a ceiling based on T·Ω (i.e. $N=\lceil T \cdot \Omega \rceil$). The windows can then be adaptive, for example, based on bandwidth Ω. As further described above, however, any one of the variables (N, T, Ω) may be varied in adapting the windows. To simplify implementation, for example through a system and/or circuitry, some embodiments may fix N.

It is noted that the processing to provide the expansion may be performed in parallel. In some embodiments, as described t transform coefficients (e.g., the Fourier coefficients) for a segment $\mathbb{S}_k$ can be generated in parallel. Further, the expansion can maintain orthogonality of adjacent windows, including the orthogonality for overlapping regions of adjacent windows at least in part through the product of the windowed signal $s \cdot \mathbb{S}_k$ with $\Psi_{j,k}$.

Referring to FIG. 6B, a projection of the coefficients 630 is shown relative to each window. An analysis is performed, in part, through a summation $$\sum_{j=1}^{N} C_{(k,j)} \Psi_{k,j}$$

of the individual Fourier series 622 in accordance with $$s(t) \approx \sum_{k} \left[ \sum_{j=1}^{N} \langle s, \Psi_{k,j} \rangle \Psi_{k,j}(t) \right].$$

(see equations 26 and 27 above). In some embodiments, this can provide a recreation of a close approximation of the original signal.

Figure 7:
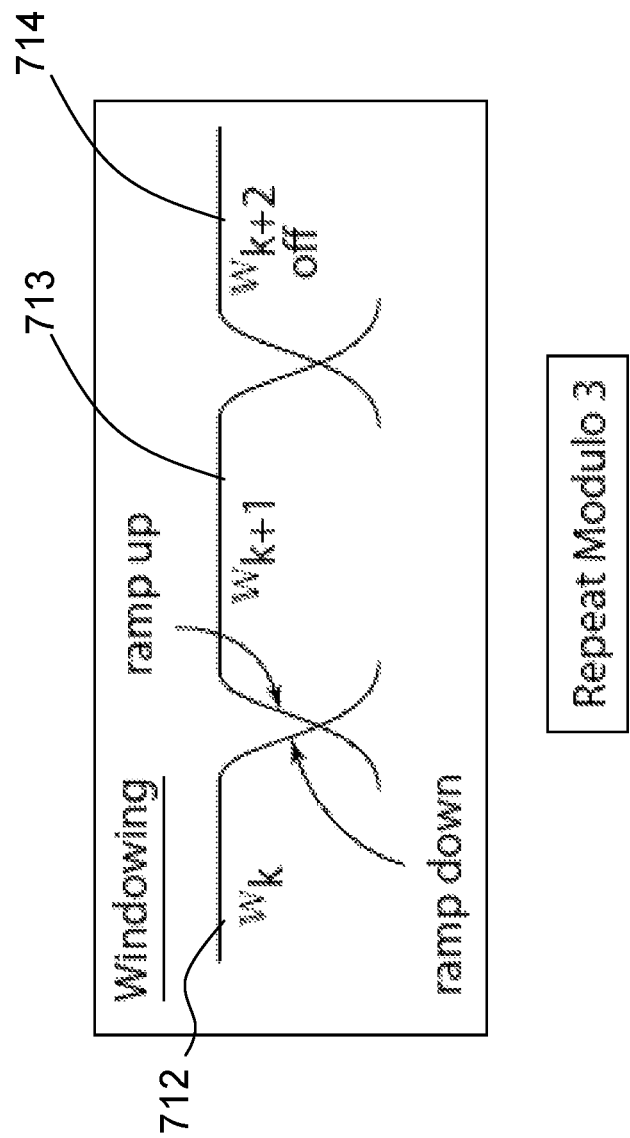
FIG. 7 shows a simplified graphical representation of at least portions of a series of segments and basis windows, in accordance with some embodiments, provided in response to the windowing provided in the process of FIG. 2.

Referring back to FIG. 2, again some embodiments provide the projected sampling based on the adaptive signal segmenting 212, a transmission or analysis 214 of the signal and a reconstruction or synthesis of the signal 216. FIG. 7 shows a simplified graphical representation of at least portions of a series of segments and basis windows 612-614 ($\mathbb{W}_k$, $\mathbb{W}_{k+1}$, $\mathbb{W}_{k+2}$, etc.), in accordance with some embodiments, provided in response to the windowing in step 212. Some embodiments implement a number of separate processings to perform the segmenting. Further, in some instances, the separate processing can be performed by separate circuitry and/or chips. In the example in FIG. 7, there are three separate processings, where in some embodiments the processing can be performed by three separate processes and/or separate circuitry or chips. In this example, processing is being performed for the first window segment 612, while preparing to initiate processing for the second segment$_{k+1}$ 613, and while processing for the third window segment$_{k+2}$ is idle or in a rest state. This rest state can be advantageous in some implementations as it can allow circuitry to cool down to limit or avoid overheating of the circuitry, which can cause non-linear operation of the circuitry. This can be implemented with 5, 7 . . . separate processings.

As window 1 begins to ramp down, the processing relative to the signal corresponding to window 2 begins ramping up, while processing corresponding to window 3 can be idle. Similarly, as window 2 begins ramping down, the processing of the signal corresponding to window 3 ramps up, while processing corresponding to window 1 (i.e., a subsequent window following window 3 in time) is idle. This provides a cycling of processing, and in this example, provides a three phase cycling (modulo 3). Other cycling can be provided, such as a five phase or even seven cycle when it would be beneficial, such as to provide greater idle or cool down time.

The multiple modulo implementation can further be advantageous, for example, in that when $\mathbb{W}_k$ is ramping down, and $\mathbb{W}_{k+1}$ is ramping up; processing would have to effectively wrap $\mathbb{W}_{k+1}$ to simultaneously provide processing for $\mathbb{W}_{k+2}$. Alternatively, with the plurality of processing phases, while $\mathbb{W}_{k+1}$ is in its flat portion $\mathbb{W}_k$ can be off, and $\mathbb{W}_{k+2}$ is getting ready to activate. Then processing can subsequently reconnect with $\mathbb{W}_k$ while $\mathbb{W}_{k+2}$ is in its flat spot, hence the modulo 3 and the three base windows.

FIG. 8 shows a simplified flow diagram of a process 810 of providing the transmission and/or analysis of the segmented signal (s(t)·$\mathbb{S}_k$(t)), in accordance with some embodiments, and in some instances can be used to implement step 214 of the process 210 of FIG. 2, and in some embodiments, corresponds to the processing of a windowed signal represented in FIGS. 6A-6B. In step 812, the segmented signal is received and read in. In step 814, respective periodic series expansions are performed on the segment (k). This can provide a computable, atomic time-frequency decomposition of the signal, which can be sensitive to both position in time and frequency simultaneously. For example, a generalized Fourier series expansion can be applied in obtaining the coefficients.

It is noted that in some embodiments, some or all of the expansion (and/or sampling, e.g., analog-to-digital sampling) can be performed in parallel, where multiple coefficients of a segment, and typically all of the coefficients of a segment can be processed in parallel. As described above, the parallel processing can be advantageous with ultra-wide band (UWB) signals to perform the expansion by constructed in parallel. In some instances, the parallel processing may be achieved, for example, by fixing N across multiple windows over the signal, which can fix the number of base elements (and "Fourier coefficients") that are computed. For example, an UWB signal can be mapped quickly using a fixed segment size, where with each segment the processing does not have to serially wait for samples. Instead, the sampling coefficients (e.g., coefficients 618 of FIG. 6A) for an entire window of the signal can be constructed simultaneously in parallel in the frequency space. The parallel processing is typically quicker. Adaptive windowing can still be performed while utilizing parallel processing, but typically at the expense of increased processing and/or processing time.

Still referring to FIG. 8, in step 816 the series coefficients (e.g., Fourier coefficients) can be transmitted, stored and/or analyzed. For example, the sampling and the Fourier coefficients can be utilized as a first part of a spectrum analyzer, where spectral analysis can be performed on the Fourier coefficients. Further, in at least some embodiments the transmit, store and/or analysis of step 816 can be at least partially implemented consistent with FIG. 6B based in the projection of the coefficients 630 ($C_{(k,1)}$, $C_{(k,2)}$, . . . , $C_{(k,N)}$).

FIG. 9 depicts a simplified flow diagram of a process 910 of providing a reconstruction and/or synthesis of the coefficients in accordance with some embodiments. In some embodiments, the process 910 can implement some or all of step 216 of FIG. 2. In step 912, coefficients for at least a pair of adjacent windows are received. In step 914, the synthesis of overlapping windows is performed such that $$\sum_{j=1}^{N} C_{(k,j)} \Psi_{k,j}(t) + \sum_{j=1}^{N} C_{(k+1,j)} \Psi_{k+1,j}(t).$$

Because of the previously performed analysis in the frequency domain the errors on each segment are summable, and the reconstruction through the summation during the synthesis provides substantially a perfect reconstruction in the time domain. Accordingly, in some embodiments, the coefficients are considered in pairs of adjacent windows, for example:

{$C_{(k,1)}$, $C_{(k,2)}$, . . . , $C_{(k,N)}$}, and
{$C_{(k+1,1)}$, $C_{(k+1,2)}$, . . . , $C_{(k+1,N)}$}.

This summation is not limited to just k and k+1, but is applicable to any k (arbitrary index k). Again, the use of the pair of coefficients is based on the overlap between windows. The Ψ, and $C_k$ have built into them the overlap, and the coefficients of adjacent windows $C_{k,n}$ and the $C_{k+1,n}$ dovetail seamlessly with each other perfectly (e.g., sine and cosine, or any other orthonormal basis), consistent with the folding technique. Accordingly, from a summation point of view, the ramps of the windows are effectively eliminated. Further, in some implementations, the summation can split coefficients relative to overlapping segments, while still summing in at least pairs of segments.

Still referring to FIG. 9, in step 916 a reindexing is performed, e.g., k goes to k+1 and both values are then reindexed by modular arithmetic relative to a subsequent segment to continue the segment pairing. The process 910 can then return to step 912 to continue the reconstruction and/or synthesis of the signal in the time domain over the remainder of the signal (or until the process is otherwise terminated).

In some implementations, the transform and computation of the coefficients can be considered as analysis under step 214 of FIG. 2, while the synthesis in step 216 of FIG. 2 can comprise the re-building of the signal in the time domain. It is noted that at least a portion of the reconstruction and/or synthesis of step 216 and the process 910 occurs in the time domain. Accordingly, the reconstruction and/or synthesis can introduce truncation error. The amount of truncation error, however, can be reduced by providing smooth ramping basis windows, where the smoother the windows the smaller the truncation error that occurs. It is further noted, however, the there is no jitter error at least in part due to the windowing and/or parallel processing. Similarly, there is typically no aliasing error as a result of the above described processes because there typically is no aliasing implemented.

In traditional analog-to-digital (A/D) and/or digital-to-analog (D/A) sampling there are four main types of errors: truncation error that typically cut off samples in time, aliasing error where sample typically cannot be performed quickly enough, jitter error in which incorrect placement of the sample occurs, and computational error that is generally inherent error resulting from the systems implementing the sampling. Again, as described above, many if not all of the embodiments can substantially eliminate two of the main errors. Generally, there is no aliasing performed and as such there is no aliasing error. Further, the windowing provided in the present embodiments, parallel processing and/or the pairing of adjacent segments can eliminate or substantially reduce jitter error. Accordingly, the errors result from truncation errors and computation errors. The truncation errors can occur on each window. These truncation errors, however, can be reduced through control of the smoothness of the basis windows, where the smoother the window the less truncation error that occurs. Again, computational error is inherent in the system and can be reduced through precision design, manufacturing, implementation and/or assembly of the systems, code and/or software used in implementing the present embodiments The present embodiments provide segmentation basis windowing methods and systems for time-frequency analysis. At least some of these embodiments provide for windowing with variable partitioning length, variable roll-off and variable smoothness. Further, in some instances, the adaptive windows can be constructed with smooth bounded adaptive partitions (which may be of unity) using B-splines. These methods and systems are useful whenever a partition of unity is used, such as in compressed sensing.

Some embodiments further preserve orthogonality of orthonormal systems between adjacent windows. These are used to develop basis windowing systems for time-frequency analysis, and can provide a "projection method" for time-frequency analysis of a signal. Still further, some embodiments simplify and/or reduce processing through a concept of almost orthogonality and the B-spline techniques to create almost orthogonal basis windowing systems that can often be more readily computable and/or constructible through circuits and/or chips than the orthogonality preserving systems, which can result in lower costs and/or faster processing while still providing results that satisfy desired threshold accuracy.

The projection method can comprise a method for analog-to-digital encoding that can be implemented similar to or as an alternative to Shannon Sampling. Further, some embodiments of the projection method can provide accurate processing of adaptive frequency band (AFB) and/or ultra-wide band (UWB) signals that typically cannot accurately be processed with traditional W-K-S Sampling. The present embodiments provide quick and accurate computations of Fourier coefficients, which in some implementations can be computed in hardware, where at least some embodiments can be configured to implement the effective adaptive windowing systems. For example, the computation of the coefficients allow for very short (e.g., for UWB) and/or variable (e.g., for AFB) windows, and the design of the orthonormal (ON) basis windowing systems preserve orthogonality between blocks and provide decay for the modulation of the signals caused by truncation in time. Given an ON basis windowing system $\{\mathbb{W}_k(t)\}$ and $\{\Psi_{k,j}\}$, an orthonormal basis that preserves orthogonality between adjacent windows, for $f \in \mathbb{PW}_\Omega$, letting $N=N(T, \Omega)$ such that $\langle f \cdot \mathbb{W}_k, \Psi_n \rangle = 0$ for $n>N$; then, $f(t) \approx f\rho(t)$, where $$f_\mathcal{P}(t) = \sum_{k \in \mathbb{Z}} \left[ \sum_{j=1}^{N} \langle f, \Psi_{k,j} \rangle \Psi_{k,j}(t) \right]. \tag{34}$$

Further, with the flexibility of the windowing systems, an adaptive projection system for ON windowing can be achieved. Given $f$, $\hat{f} \in L^2(\mathbb{R})$ and $f$ having a variable but bounded band-limit $\Omega(t)$, with $\tau(t)$ being an adaptive block of time, letting $\{\mathbb{W}_k(t)\}$ be a ON window system with window size $\tau(t)+2r$ on the kth block and $\{\Psi_{k,j}\}$ be an orthonormal basis that preserves orthogonality between adjacent windows; given $\tau(t)$, with $\overline{\Omega}(t) = \max\{\Psi(t); t \in \tau(t)\}$, and letting $N(t)=N(\tau(t), \Psi(t))$ be such that $\langle f, \Psi_{k,j} \rangle = 0$; then, $f(t) \approx f\rho(t)$, where $$f_\mathcal{P}(t) = \sum_{k \in \mathbb{Z}} \left[ \sum_{j=1}^{N(t)} \langle f, \Psi_{k,j} \rangle \Psi_{k,j}(t) \right]. \tag{35}$$

It is noted that this adaptable time segmentation may, in some instances, make the analysis more complicated, but demonstrates at least some of the benefits the present embodiments provide over conventional means. Further, at least some aspects of the projection methods can be considered, in some instances, as an "adaptive Gabor-type" system for analysis in time-frequency. These methods and/or systems can be configured to provide either very short and/or variable windowing, with windows created using the theory of splines. The corresponding modulation terms are from an ON basis which preserves orthogonality between adjacent blocks and can be tailored to the class of input signals analyzed. It was considered that if one looks at the construct for binary signals using Walsh functions, one is reminded of Haar wavelets. Some embodiments provide what can be considered Walsh projection systems. These systems can be configured as an "adaptive wavelet" system with substantially no fixed underlying window size. A potential drawback or price paid for achieving this adaptability can be the giving up of the structure of the Gabor or wavelet systems.

In some instances, the above described theory of windows, defined according to mathematical structures, in which to express sampling via the projection method. Many non-uniform sampling schemes could be expressed in terms of this language of frames. Accordingly, some embodiments provide a computable atomic decomposition of time-frequency space. These embodiments can be configured to provide a way of non-uniformly tiling time and frequency so that when a the signal has, for example, a burst of high-frequency information, the methods and/or systems can window quickly and efficiently in time and broadly in frequency, whereas when the signal has a relatively low-frequency segment, windowing can be defined broadly in time and efficiently in frequency.

The present methods and systems can address efficiency and cost issues of broadband wireless and wire line transmission and reception. The need to transmit a much larger volume of information at lesser costs is imperative in the ever-expanding communications industry. These methods and systems can allow signals to be processed through various communications devices significantly times faster than existing systems. Further, the present embodiments provide a significant change of view in signal processing, which movies the process from one of a stationary viewpoint to a short-term or adaptive segmented stationarity. There are numerous applications for the present embodiments that can:

result in the development of low-cost transceivers;
allow for more throughput or better communication quality in existing communication links;
contribute to the growing demand for ultra-sensitive electronic equipment (e.g., warfare equipment in the defense arena);
allow for more communications of all types from all sources processed per energy spent on communication; and
numerous other advantageous results.

Techniques for general windowing are useful in developing the time-frequency analysis of functions. Some embodiments provide basis windowing systems that have variable partitioning length, variable roll-off and variable smoothness. For example, some embodiments can be configured to construct smooth bounded adaptive partitions, which in some instances can be of unity, using B-splines. These systems give a flexible adaptive partition of unity of variable smoothness. Further, some embodiments can be configured to preserve orthogonality of orthonormal systems between adjacent windows. For example, these embodiments may be used to provide tiling systems for time-frequency analysis, and give a "projection method" for time-frequency analysis of a signal. Still further, some embodiments implement a method of almost orthogonality and the B-spline techniques to create almost orthogonal basis windowing methods and systems that can be more computable and/or constructible in some instances than some of the orthogonality preserving methods and/or systems.

Again, the present embodiments provide a computable atomic decomposition of time-frequency space. Some embodiments provide efficient methods to analyze signals allowing for changing and/or ultra-wide frequency bands. Further, some embodiments provide non-uniform windowing time and frequency so that when a signal has a variation in bandwidth the windowing can be altered, such as when a signal has a burst of high-frequency information the method and/or system can window quickly and efficiently in time and broadly in frequency, whereas when the signal has a relatively low frequency segment the method and/or system can window broadly in time and efficiently in frequency. Still further, the systems are readily implemented in circuitry.

FIG. 10, there is illustrated a system 1000 that may be used in processing signals in accordance with at least some embodiments. The system 1000 can include a received and/or transceiver 1002, one or more communication links, paths, buses or the like 1004, and one or more processing systems, chips or units 1006. The transceiver 1002 can be configured to receive the signal to be processed. The processing systems 1006 can be substantially any circuitry, circuits, chips, ASICs and/or combinations thereof that can implement the processing, which can include but is not limited to one or more of perform the segmentin, the transform series expansion, the calculations, summations, sampling, transmitting, storing, analyzing, reconstructing, synthesizing, transmitting and the like. Similarly, the processing system 1006 may include one or more processors, microprocessors, central processing units, logic, local digital storage, firmware and/or other control hardware and/or software. As described above, in some instances, multiple phase cycling (e.g., three phase cycling, five phase cycling, etc.) may be implemented. As such, the system may include multiple processing systems 1006 to implement the multiple cycles.

The methods, techniques, systems, devices, services, and the like described herein may be utilized, implemented and/or run on many different types of devices and/or systems. Referring to FIG. 11, there is illustrated a system 1100 that may be used for any such implementations, in accordance with some embodiments. One or more components of the system 1100 may be used for implementing any system, apparatus, module, unit or device mentioned above or below, or parts of such systems, apparatuses, modules, unit or devices, such as for example any of the above or below mentioned circuitry, chips, ASICs, systems, processing systems 1006, processors, and the like. However, the use of the system 1100 or any portion thereof is certainly not required.

By way of example, the system 1100 may comprise a controller or processor module 1112, memory 1114, one or more communication links, paths, buses or the like 1120, and in some instances a user interface 1116. A power source or supply (not shown) is included or coupled with the system 1100. The controller 1112 can be implemented through one or more processors, microprocessors, central processing unit, logic, local digital storage, firmware and/or other control hardware and/or software, and may be used to execute or assist in executing the steps of the methods and techniques described herein, and control various transforms, analysis, transmissions, storage, reconstruction, synthesis, windowing, measuring, communications, programs, interfaces, etc. The user interface 1116, when present, can allow a user to interact with the system 1100 and receive information through the system. In some instances, the user interface 1116 may includes a display 1122, LEDs, audio output, and/or one or more user inputs 1124, such as keyboard, mouse, track ball, touch pad, touch screen, buttons, track ball, etc., which can be part of or wired or wirelessly coupled with the system 1100.

Typically, the system 1100 further includes one or more communication interfaces, ports, transceivers 1118 and the like allowing the system 1100 to at least receive signals, which can be communicated wired or wirelessly over substantially any communication medium (e.g., over a distributed network, a local network, the Internet, communication link 1120, other networks or communication channels with other devices and/or other such communications). Further the transceiver 1118 can be configured for wired, wireless, optical, fiber optical cable or other such communication configurations or combinations of such communications.

The system 1100 comprises an example of a control and/or processor-based system with the controller 1112. Again, the controller 1112 can be implemented through one or more processors, controllers, central processing units, logic, software and the like. Further, in some implementations the controller 1112 may provide multiprocessor functionality.

The memory 1114, which can be accessed by the controller 1112, typically includes one or more processor readable and/or computer readable media accessed by at least the controller 1112, and can include volatile and/or nonvolatile media, such as RAM, ROM, EEPROM, flash memory and/or other memory technology. Further, the memory 1114 is shown as internal to the system 1110; however, the memory 1114 can be internal, external or a combination of internal and external memory. The external memory can be substantially any relevant memory such as, but not limited to, one or more of flash memory secure digital (SD) card, universal serial bus (USB) stick or drive, other memory cards, hard drive and other such memory or combinations of such memory. The memory 1114 can store code, software, executables, scripts, data, signals, samples, coefficients, programming, programs, media stream, media files, identifiers, log or history data, user information and the like.

One or more of the embodiments, methods, processes, approaches, and/or techniques described above or below may be implemented in one or more processor and/or computer programs executable by a processor-based system. By way of example, such a processor based system may comprise the processor based system 1100, a computer, an encoder, an analog-to-digital converter, a player device, etc. Such a computer program may be used for executing various steps and/or features of the above or below described methods, processes and/or techniques. That is, the computer program may be adapted to cause or configure a processor-based system to execute and achieve the functions described above or below. For example, such computer programs may be used for implementing any embodiment of the above or below described steps, processes or techniques. As another example, such computer programs may be used for implementing any type of tool or similar utility that uses any one or more of the above or below described embodiments, methods, processes, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Accordingly, some embodiments provide a processor or computer program product comprising a medium configured to embody a computer program for input to a processor or computer and a computer program embodied in the medium configured to cause the processor or computer to perform or execute steps comprising any one or more of the steps involved in any one or more of the embodiments, methods, processes, approaches, and/or techniques described herein. For example, some embodiments provide one or more computer-readable storage mediums storing one or more computer programs for use with a computer simulation, the one or more computer programs configured to cause a computer and/or processor based system to execute steps comprising: receiving a communication signal; adaptively partitioning the signal in a time domain into a plurality of segment of the signal; transforming each of the segments of the signal producing respective expansions in a frequency domain and obtaining respective samples of the windows of signal in the frequency domain; and mapping the samples in the frequency domain back into the time domain.

The present embodiments provide methods and systems configured to provide time-frequency analysis, including basis windowing systems providing signal time-frequency analysis. For example, some embodiments provide methods of processing signals. These methods can comprise: receiving a signal; adaptively partitioning the signal in a time domain into a plurality of segments of the signal; and transforming each portion of the signal of each segments producing respective expansions in a frequency domain and analyzing and/or obtaining respective samples of the respective expansions in the frequency domain. Some embodiments further map the samples in the frequency domain back into the time domain.

Many of the functional units described in this specification have been labeled as systems, modules, units, etc., in order to more particularly emphasize their implementation independence. For example, a system or module may be implemented as a hardware circuit comprising custom VLSI circuits or gate arrays, off-the-shelf semiconductors such as logic chips, transistors, or other discrete components. A system and/or module may also be implemented in programmable hardware devices such as field programmable gate arrays, programmable array logic, programmable logic devices or the like.

Some or all of the systems and/or modules may also be implemented in software for execution by various types of processors. An identified system and/or module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a system or module of executable code could be a single instruction, or many instructions, and may even be distributed over several different code segments, among different programs, and across several memory devices. Similarly, operational data may be identified and illustrated herein within systems or modules, and may be embodied in any suitable form and organized within any) suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A method of processing a signal, comprising: by one or more processors: adaptively partitioning at least a portion of a communication signal, in a time domain, into a plurality of segments of the signal; and transforming each of the segments of at least the portion of the signal producing respective expansions in a frequency domain and obtaining respective samples of the segments of the signal in the frequency domain while preserving orthogonality of basis elements in the segments, including regions of overlap.

2. The method of claim 1, further comprising: mapping the samples in the frequency domain back into the time domain.

3. The method of claim 1, wherein the transforming the segments of the signal comprises individually applying generalized Fourier series to each of the windows of the signal.

4. The method of claim 1, wherein the adaptively partitioning the at least the portion of the signal in the time domain into the plurality of segments comprises applying B-splines in constructing the basis windows of the signal.

5. The method of claim 1, wherein the adaptively partitioning the at least the portion of the signal in the time domain into the plurality of segments comprises controlling a smoothness in time and corresponding decay in frequency of each window of the signal by controlling the basis windowing and basis elements.

6. The method of claim 1, wherein the adaptively partitioning the at least the portion of the signal in the time domain into the plurality of segments comprises partitioning the at least the portion of the signal in the time domain into the plurality of segments such that a plurality of the segments that are adjacent have overlapping segment boundaries.

7. The method of claim 1, wherein the adaptively partitioning the at least the portion of the signal in the time domain into the plurality of segments comprises defining the partitions such that orthogonality is preserved for orthonormal (ON) system between adjacent windows.

8. The method of claim 1, further comprising: encoding the signal through an encoder, comprising performing: the adaptively partitioning the at least the portion of the signal in the time domain into the plurality of segments of the signal; and the transforming each of the segments of the signal producing respective expansions in the frequency domain and obtaining respective samples of the segments of the signal in the frequency domain while preserving orthogonality of basis elements in the segments, including the regions of overlap.

9. A method of processing a signal, comprising: by one or more processors: partitioning at least a portion of a signal, in a time domain, into a plurality of segments of the signal; and transforming each of the segments of at least the portion of the signal producing respective expansions in a frequency domain while preserving orthogonality between the segments including overlapping regions of two adjacent segments, wherein for each segment of the signal of the respective expansions are obtained through parallel processing obtaining in parallel respective samples of the segments of the signal in the frequency domain.

10. The method of claim 9, wherein the transforming each of the segments comprises transforming each of the segments such that sampling coefficients for an entire segment is constructed simultaneously in parallel in the frequency domain.

11. The method of claim 9, further comprising: mapping the samples in the frequency domain back into the time domain.

12. The method of claim 11, wherein the partitioning the signal comprises adaptively partitioning the signal such that each of the plurality of segments are partitioned as a function of bandwidth of the window.

13. The method of claim 11, wherein the partitioning the signal comprises partitioning the signal according to a fixed segment size of each of the plurality of segments.

14. A method of processing a signal, comprising: by one or more processors: partitioning at least a portion of a signal in a time domain into a plurality of segments of the signal; and transforming each of the segments of the signal producing respective expansions in a frequency domain and obtaining respective samples of the segments of signal in the frequency domain while preserving orthogonality in the region of overlap in the segments.

15. The method of claim 14, wherein the partitioning the at least the portion of the signal comprises partitioning the at least the portion of the signal such that the at least two of the plurality of segments have overlapping regions; and wherein the transforming each of the windows of the signal comprises transforming each of the segments of the signal while preserving the orthogonality between the plurality of segments including preserving the orthogonality in the overlapping regions.

16. The method of claim 15, wherein the partitioning the signal in the time domain into the plurality of segments comprises applying B-splines in constructing the basis windows of the signal.

17. The method of claim 15, wherein the partitioning the signal in the time domain into the plurality of segments of the signal comprises adaptively partitioning the signal in the time domain into the plurality of segments of the signal such that the segments vary as a function of bandwidth.

18. A method of processing a signal, comprising: adaptively partitioning at least a portion of a communication signal in a time domain into a plurality of segments of the signal, wherein the adaptively partitioning comprises applying B-splines in constructing the basis windows of the signal; and transforming each of the segments of the signal producing respective expansions in a frequency domain and analyzing the transformed segments of the signal in the frequency domain.

19. The method of claim 18, wherein the transforming each of the segments of the signal producing respective expansions in the frequency domain comprises transforming each of the segments of the signal while preserving orthogonality between adjacent segments.

20. The method of claim 19, wherein the partitioning the signal comprises partitioning the signal such that the at least two of the plurality of segments have overlapping regions, and wherein the transforming each of the segments of the signal comprises transforming each of the segments of the signal while preserving the orthogonality between the adjacent segments including preserving the orthogonality in the overlapping regions.

* * * * *